(12) United States Patent
Narayanan et al.

(10) Patent No.: US 11,232,241 B2
(45) Date of Patent: Jan. 25, 2022

(54) SYSTEMS AND METHODS FOR DESIGNING NEW MATERIALS FOR SUPERLUBRICITY

(71) Applicant: UCHICAGO ARGONNE, LLC, Chicago, IL (US)

(72) Inventors: Badri Narayanan, Clarendon Hills, IL (US); Subramanian Sankaranarayanan, Naperville, IL (US); Anirudha V. Sumant, Plainfield, IL (US); Mathew J. Cherukara, Lemont, IL (US); Diana Berman, Denton, TX (US)

(73) Assignee: UChicago Argonne, LLC, Chicago, IL (US)

( * ) Notice: Subject to any disclaimer, the term of this patent is extended or adjusted under 35 U.S.C. 154(b) by 680 days.

(21) Appl. No.: 16/036,039

(22) Filed: Jul. 16, 2018

(65) Prior Publication Data
US 2020/0019656 A1   Jan. 16, 2020

(51) Int. Cl.
*G06F 30/20* (2020.01)
*G06F 9/451* (2018.01)
*G06F 30/28* (2020.01)
*G06F 30/25* (2020.01)
*G06F 111/10* (2020.01)

(52) U.S. Cl.
CPC ............ *G06F 30/20* (2020.01); *G06F 9/451* (2018.02); *G06F 30/25* (2020.01); *G06F 30/28* (2020.01); *G06F 2111/10* (2020.01)

(58) Field of Classification Search
CPC .......... G06F 30/20; G06F 9/451; G06F 30/25; G06F 30/28

USPC ............................................................ 703/2
See application file for complete search history.

(56) References Cited

U.S. PATENT DOCUMENTS

| | | | | |
|---|---|---|---|---|
| 7,392,142 B2* | 6/2008 | Kaldor | ............... | G01N 33/2888 702/22 |
| 7,684,933 B2* | 3/2010 | Gao | ..................... | G05B 13/042 702/25 |

(Continued)

FOREIGN PATENT DOCUMENTS

EP   3 062 092 A1   8/2016

OTHER PUBLICATIONS

Berman et al. ("Macroscale superlubricity enabled by graphene nanoscroll formation", sciencemag.org, 2015, pp. 1118-1122) (Year: 2015).*

(Continued)

*Primary Examiner* — Iftekhar A Khan
(74) *Attorney, Agent, or Firm* — Foley & Lardner LLP

(57) ABSTRACT

A method for designing new materials for superlubricity comprises developing, on a computational system, a computational supercell comprising x unit cells of a base material, each unit cell comprising y atoms of the base material. The computational system replaces randomly chosen z atoms of the base material with an impurity atom of an impurity material to form a candidate material. The computational system determines volumetric strain of the candidate material. In response to the volumetric strain exceeding a predetermined threshold, the computational system determines that the candidate material has superlubricity. The computational system displays the candidate material to a user if the candidate material has superlubricity.

18 Claims, 21 Drawing Sheets

(56) References Cited

U.S. PATENT DOCUMENTS

| | | | | |
|---|---|---|---|---|
| 8,296,109 | B2* | 10/2012 | Feng | G06F 30/20 703/7 |
| 9,561,526 | B2* | 2/2017 | Sumant | C10M 177/00 |
| 9,806,164 | B1* | 10/2017 | Terrones | H01L 21/02499 |
| 9,836,563 | B2* | 12/2017 | Liu | G06F 30/327 |
| 9,881,111 | B2* | 1/2018 | Liu | G06F 30/327 |
| 9,890,345 | B2* | 2/2018 | Sumant | B05D 5/08 |
| 10,763,000 | B1* | 9/2020 | Argibay | C23C 14/16 |
| 2005/0092072 | A1* | 5/2005 | Wollenberg | G01N 3/56 73/53.05 |
| 2005/0095714 | A1* | 5/2005 | Wollenberg | B01J 19/0046 436/55 |
| 2005/0096895 | A1* | 5/2005 | Wollenberg | G06Q 50/04 506/8 |
| 2005/0182572 | A1* | 8/2005 | Wollenberg | G01N 33/2835 702/22 |
| 2006/0172897 | A1* | 8/2006 | Yamamoto | C10M 173/00 508/155 |
| 2007/0158609 | A1* | 7/2007 | Hong | C10M 177/00 252/71 |
| 2008/0116011 | A1* | 5/2008 | Takahama | B21B 45/0251 184/6.26 |
| 2008/0302998 | A1* | 12/2008 | Hong | C09K 5/10 252/74 |
| 2009/0033164 | A1* | 2/2009 | Khan | C10M 169/04 310/90 |
| 2009/0056802 | A1* | 3/2009 | Rabani | B82Y 30/00 136/256 |
| 2010/0011826 | A1* | 1/2010 | Buehler | C23C 24/04 72/42 |
| 2011/0046027 | A1* | 2/2011 | Zhamu | C10M 103/02 508/113 |
| 2011/0140033 | A1* | 6/2011 | Chen | C09K 5/10 252/74 |
| 2011/0220841 | A1* | 9/2011 | Zheng | C09K 5/06 252/71 |
| 2012/0115761 | A1* | 5/2012 | Basu | C10M 133/16 508/156 |
| 2012/0118255 | A1* | 5/2012 | Jung | C09D 163/04 123/193.6 |
| 2012/0122743 | A1* | 5/2012 | Ivanov | C10M 129/34 508/117 |
| 2013/0190449 | A1* | 7/2013 | Kinloch | C01B 32/23 525/50 |
| 2013/0324447 | A1* | 12/2013 | Tsou | C10M 161/00 508/131 |
| 2014/0023864 | A1* | 1/2014 | Sumant | C10M 103/04 428/408 |
| 2015/0197701 | A1* | 7/2015 | Sumant | B05D 5/08 508/108 |
| 2015/0367381 | A1* | 12/2015 | Sumant | C10M 103/04 508/105 |
| 2015/0368436 | A1* | 12/2015 | Chiu | C04B 35/6263 508/126 |
| 2016/0325994 | A1* | 11/2016 | Qu | C01B 21/0648 |
| 2018/0223208 | A1* | 8/2018 | Sumant | B05D 1/02 |
| 2019/0337806 | A1* | 11/2019 | Hunter | C01B 32/198 |
| 2019/0352773 | A1* | 11/2019 | Argibay | C23C 28/321 |

OTHER PUBLICATIONS

Garza et al. ("Highly strained graphene samples of varying thickness and comparison of their behaviour", Nanotechnology, 2014, pp. 1-9) (Year: 2014).*

Wang et al. ("Superlubricity of two-dimensional fluorographene/MoS2 heterostructure: a first-principles study", Nanotechnology, 2014, pp. 1-6) (Year: 2014).*

Sun et al. ("Performance of the Vienna ab initio simulation package (VASP) in chemical applications", Journal of Molecular Structure (Theochem) 624 (2003) 37-45) (Year: 2003).*

Jim Collins ("Simulations lead to design of nearfrictionless material", 2015, Argonne Leadership Computing Facility, pp. 1-8) (Year: 2015).*

Ernzerhof et al. ("Assessment of the Perdew-Burke-Ernzerhof exchange-correlation functional", 1999, Journal of Chemical Physics, pp. 5029-5036) (Year: 1999).*

Ashby, et al., "Temperature maps for frictional heating in dry sliding," Tribology Transactions 34(4), pp. 577-587 (2008).

Berger, et al., "EELS analysis of vacuum arc-deposited diamond-like films," Philosophical Magazine Letters 57(6), pp. 285-290 (1988).

Berman, et al,. "Graphene: a new emerging lubricant," Materials Today 17(1), pp. 31-42 (2014).

Berman, et al., "Few layer graphene to reduce wear and friction on sliding steel surfaces," Carbon 54, pp. 454-459 (2013).

Berman, et al., "Graphene as a protective coating and superior lubricant for electrical contacts," Applied Physics Letters 105(23), 231907, 4 pages (2014).

Berman, et al., "Macroscale superlubricity enabled by graphene nanoscroll formation," Science 348(6239), pp. 1118-1122 (2015).

Berman, et al., "Reduced wear and friction enabled by graphene layers on sliding steel surfaces in dry nitrogen," Carbon 59, pp. 167-175 (2013).

Bradt, et al., "Mass spectrum of sulfur vapor," Journal of Research of the National Bureau of Standards 57(4), pp. 223-225 (1956).

Cherukara, et al., "Silence growth through island migration and coalescence," Nanoscale 9, pp. 10186-10192 (2017).

Chhowalla & Amaratunga, "Thin films of fullerene-like MoS2 nanoparticles with ultra-low friction and wear," Nature 407, pp. 164-167 (2000).

Erdemir & Donnet, "Tribology of diamond-like carbon films: recent progress and future prospects," Journal of Physics D: Applied Physics 39(18), pp. R311-R327 (2006).

Erdemir & Eryilmaz, "Achieving superlubricity in DLC films by controlling bulk, surface, and tribochemistry," Friction 2(2), pp. 140-155 (2014).

Erdemir, et al., "Carbon-based tribofilms from lubricating oils," Nature 536, pp. 67-71 (2016).

Erdemir, et al., "Synthesis of diamondlike carbon films with superlow friction and wear properties," Journal of Vacuum Science & Technology A: Vacuum, Surfaces, and Films 18, pp. 1987-1992 (2000).

Farias, et al., "The CO coadsorption and reactions of sulfur, hydrogen and oxygen on clean and sulfided Mo(100) and on MoS2(0001) crystal faces," Surface Science 140(1), pp. 181-196 (1984).

Gao, et al., "The Effects of Film Structure and Surface Hydrogen on the Properties of Amorphous Carbon Films," Journal of Physical Chemistry B 107(40), pp. 11082-11090 (2003).

Gosvami, et al., "Mechanisms of antiwear tribofilm growth revealed in situ by single-asperity sliding contacts," Science 348(6230), pp. 102-106 (2015).

Grindy, et al., "Approaching chemical accuracy with density functional calculations: Diatomic energy corrections," Physical Review B 87(7), 19 pages (2013).

Hamon, et al., "ELNES study of carbon K-edge spectra of plasma deposited carbon films," Journal of Materials Chemistry 14, pp. 2030-2035 (2004).

Heimberg, et al., "Superlow friction behavior of diamond-like carbon coatings: time and speed effects," Applied Physics Letters 78(17), pp. 2449-2451 (2001).

Holmberg, et al., "Global energy consumption due to friction in passenger cars," Tribology International 47, pp. 221-234 (2012).

Jiang, et al., "Elastic bending modulus of single-layer molybdenum disulfide (MoS2): finite thickness effect," Nanotechnology 24(43), 435705, 6 pages (2013).

Kresse & Furthmuller, "Efficient iterative schemes for ab initio total-energy calculations using a plane-wave basis set," Physical Review B 54(16), p. 11169-11186 (1996).

Kresse & Joubert, "From ultrasoft pseudopotentials to the projector augmented-wave method," Physical Review B 59(3), pp. 1758-1775 (1999).

Mattsson, et al., "First-principles and classical molecular dynamics simulation of shocked polymers," Physical Review B 81, 054103, 9 pages (2010).

(56) References Cited

OTHER PUBLICATIONS

Mochalin, et al., "The properties and applications of nanodiamonds," Nature Nanotechnology 7, pp. 11-23 (2012).

Oya & Otani, "Catalytic graphitization of carbons by various metals," Carbon 17(2), pp. 131-137 (1979).

Perdew, et al., "Generalized Gradient Approximation Made Simple," Physical Review Letters 77(18), pp. 3865-3868 (1996).

Plimpton, "Fast Parallel Algorithms for Short-Range Molecular Dynamics," Journal of Computational Physics 117(1), pp. 1-19 (1995).

Shenderova & Gruen, "Ultra Nanocrystalline Diamond: Synthesis, Properties, and Applications," William Andrew Publishing, pp. 54-58 (2006).

Turner, et al., "Determination of Size, Morphology, and Nitrogen Impurity Location in Treated Detonation Nanodiamond by Transmission Electron Microscopy," Advanced Functional Materials 19(13), pp. 2116-2124 (2009).

Vasu, et al., "Van der Waals pressure and its effect on trapped interlayer molecules," Nature Communications 7, 12168, 6 pages (2016).

Wang, et al., "Biological and environmental interactions of emerging two-dimensional nanomaterials," Chemical Society Reviews 45, pp. 1750-1780 (2016).

Wang, et al., "Super-low friction and super-elastic hydrogenated carbon films originated from a unique fullerene-like nanostructure," Nanotechnology 19(22), 225709 (2008).

Xie, et al., "Sulfur as an important co-factor in the formation of multilayer graphene in the thermolyzed asphalt reaction," Journal of Materials Chemistry 22, pp. 5723-5729 (2012).

Zhang, et al., "Superlubricity in centimetres-long double-walled carbon nanotubes under ambient conditions," Nature Nanotechnology 8, pp. 912-916 (2013).

Zinovev, et al., "Laser-Driven Acoustic Desorption of Organic Molecules from Back-Irradiated Solid Foils," Analytical Chemistry 79(21), pp. 8232-8241 (2007).

* cited by examiner

FIG. 4C
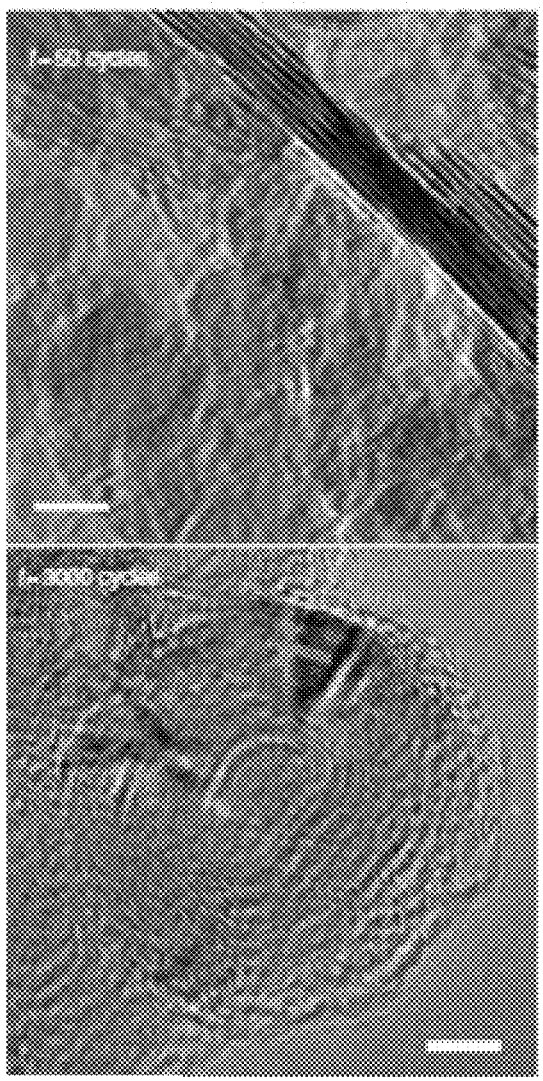
FIG. 4F
FIG. 4D
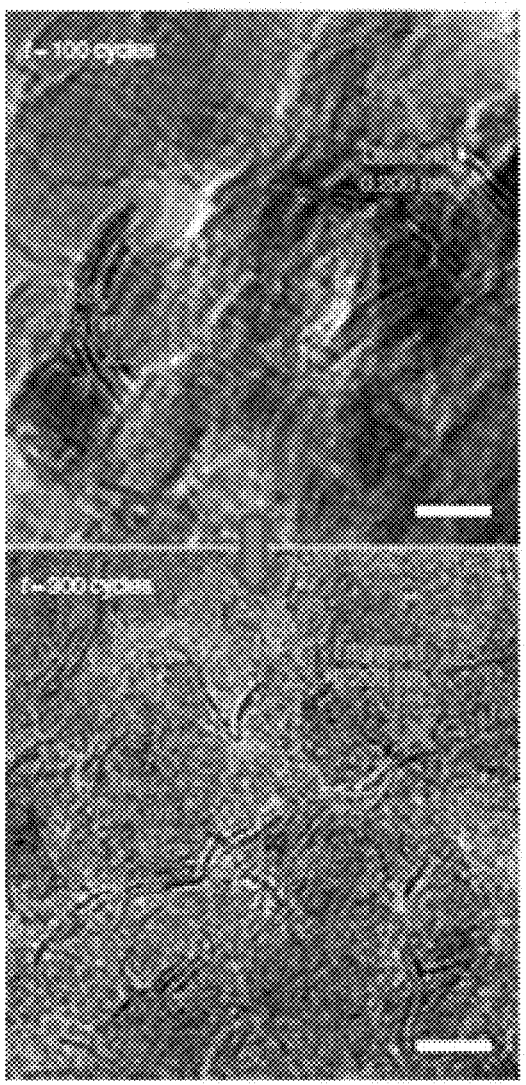
FIG. 4E

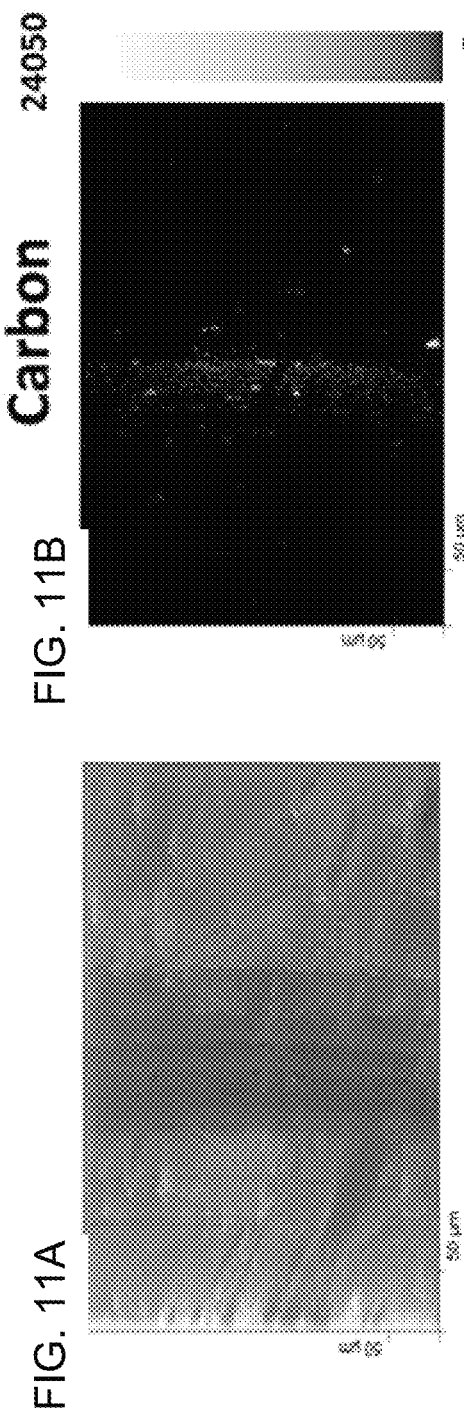
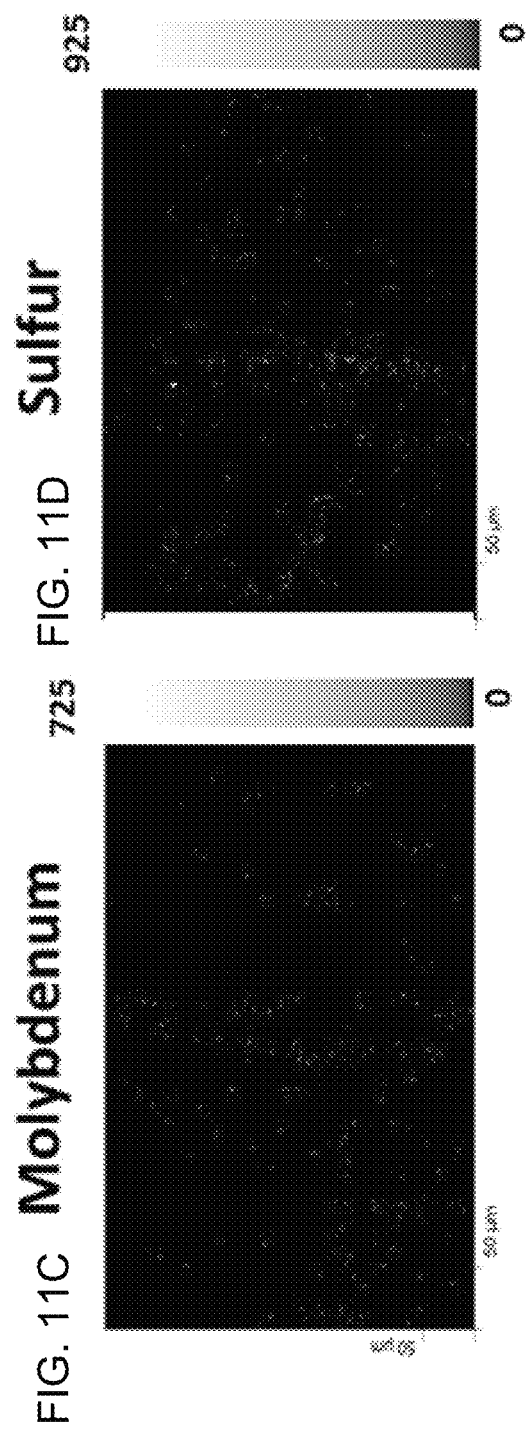
FIG. 11A  FIG. 11B  FIG. 11C  FIG. 11D

| Elements sampled by Auger Electron Spectroscopy | Atomic concentration (in atomic %) | |
|---|---|---|
| | Inside wear track | Outside wear track |
| Carbon, C1 | 15.0 | 47.2 |
| Oxygen, O1 | 83.9 | 49.3 |
| Sulfur, S1 | 0.2 | 1.2 |
| Molybdenum, Mo1 | 0.9 | 2.3 |

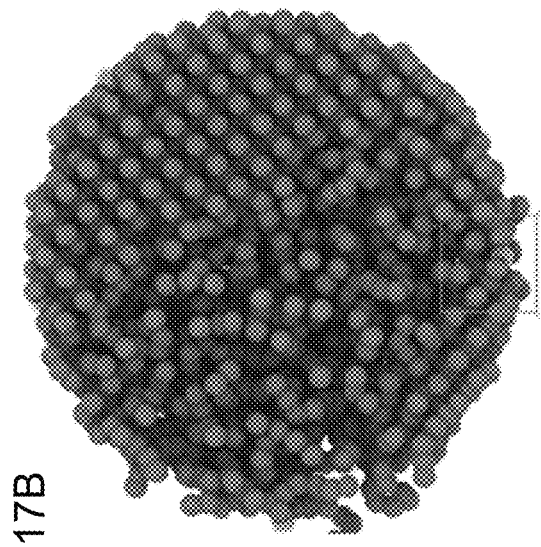
FIG. 17A
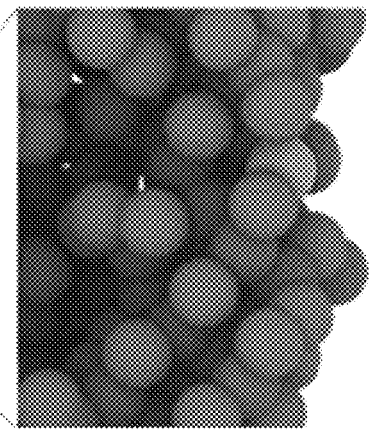
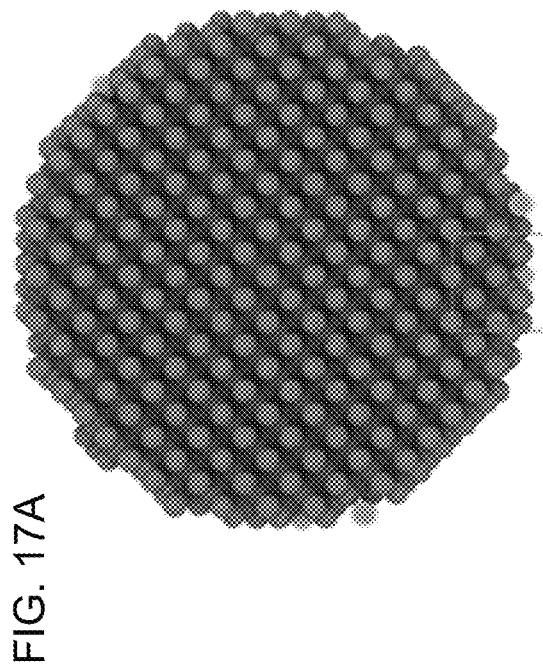
FIG. 17B
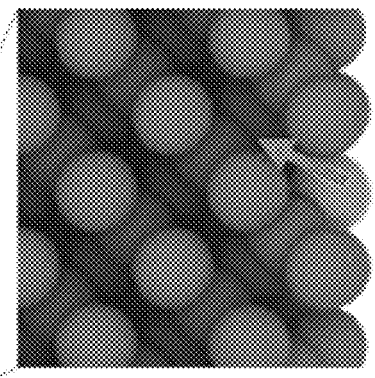
S-diffusion to sub-surface layers

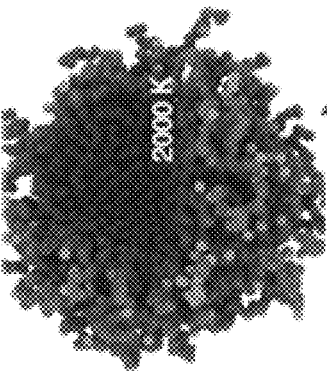
FIG. 18A  FIG. 18B  FIG. 18C  FIG. 18D
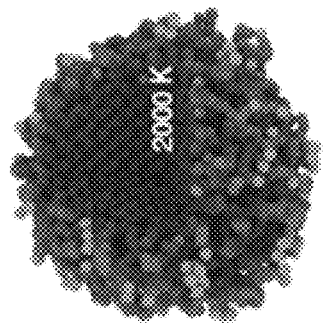
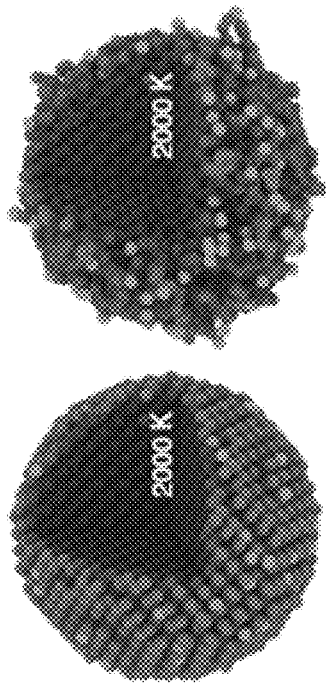
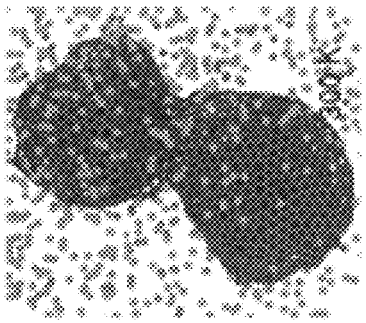
FIG. 18E
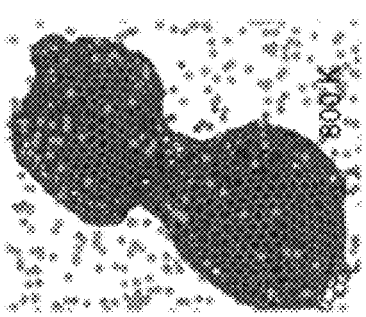
FIG. 18F
FIG. 18G
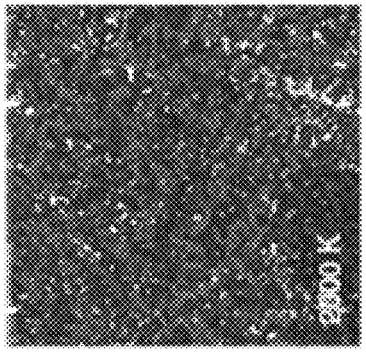
FIG. 18H

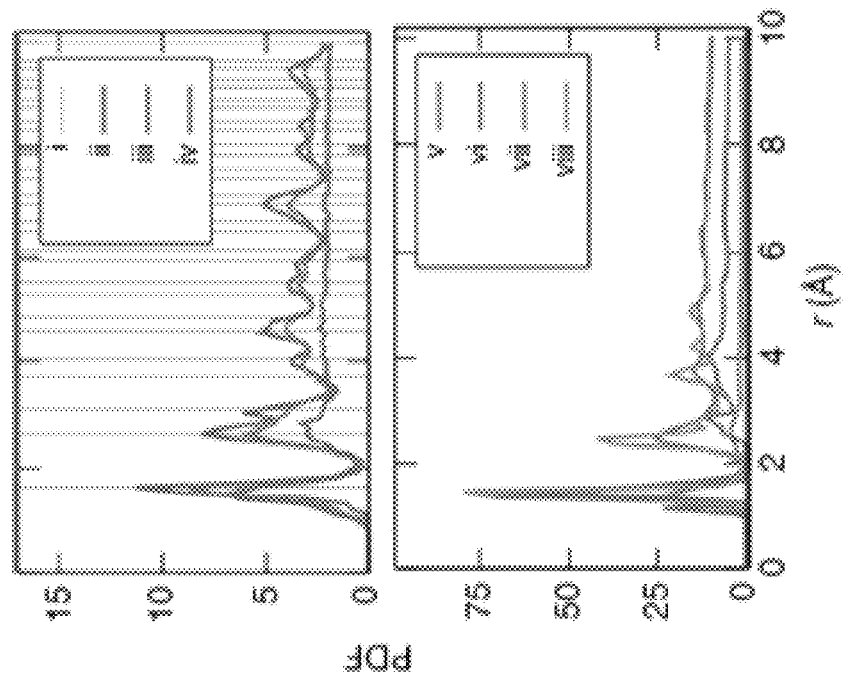
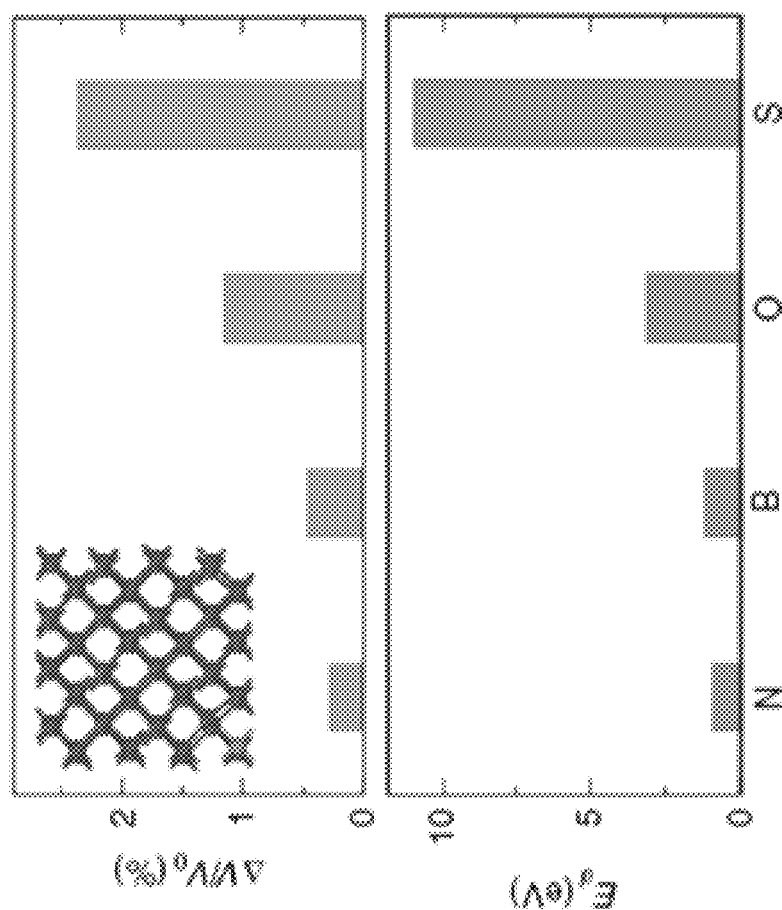
FIG. 19A
FIG. 19B

SYSTEMS AND METHODS FOR DESIGNING NEW MATERIALS FOR SUPERLUBRICITY

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to systems and methods for computationally designing new materials that have superlubricity.

BACKGROUND

Understanding and controlling the root causes of friction have long been a tireless pursuit of mankind mainly because friction impacts our safety, mobility, and environment in so many ways. Accordingly, those scientists who study friction across many scales and engineers who design, manufacture, and operate moving mechanical assemblies (MMAs), like motored vehicles, have all aimed at drastically reducing or even totally vanishing friction or achieving superlubricity at engineering scales. The superlubric regime is attractive because it would provide the highest levels of savings in energy, environment, and money. Despite the development and use of many kinds of solid and liquid lubricants in recent years, superlubricity is seldom achieved at macro or engineering scales. Generally, friction coefficients of less than 0.01 are considered super low, and hence fall in the superlubric regime. Such levels of friction coefficients are typical of those surfaces that are either aero- or hydro-dynamically separated or magnetically levitated where little or no solid-to-solid contact takes place. Under sliding regimes where direct metal-to-metal contacts prevail and high contact pressures are present, achieving superlubric friction coefficients (i.e., less than 0.01) is difficult due to the concurrent and often very complex physical, chemical, and mechanical interactions taking place at sliding surfaces.

In theory, computer simulations, and nano-scale experiments, the feasibility of superlubricity for certain atomically smooth crystalline solids that are in dry and incommensurate sliding contacts has been demonstrated. This effect, also called structural lubricity, was theoretically predicted in 1991 and later verified experimentally between two atomically smooth sliding surfaces of single crystal silicon and graphite materials. Recently, similar observations were made between the interwalls of two nested multiwalled carbon nanotubes. To enable superlubricity, atoms in these materials are oriented in a special manner and form an atomic hill-and-valley landscape, which looks like an eggcrate. When the two graphite surfaces are in registry (every 60 degrees), the friction force is high but when the two surfaces are rotated out of registry, the friction is nearly eliminated. By way of illustration, this effect is like two egg-crates which can slide over each other more easily when they are "twisted" with respect to each other. Since this effect is due to the incommensurability of lattice planes sliding against each other, the effect is restricted to material interactions at the nanoscales. At macro-scale, this structural effect, and hence superlubricity, is lost due to the structural imperfections and disorder caused by many defects. Superlubricity is very difficult to achieve at macro-scale tribological tests and mechanical systems.

SUMMARY

Embodiments described herein relate generally to systems and methods for designing materials for superlubricity, and in particular, to computational systems and methods for designing new materials using volumetric strain as a predictor of superlubricity of the material.

In some embodiments, a method for designing new materials for superlubricity comprises developing, on a computational system, a computational supercell comprising x unit cells of a base material, each unit cell comprising y atoms of the base material. The method also comprises replacing, by the computational system, randomly chosen z atoms of the base material with an impurity atom of an impurity material to form a candidate material. The volumetric strain of the candidate material is determined by the computational system. The method also comprises in response to the volumetric strain exceeding a predetermined threshold, determining, by the computational system, that the candidate material has superlubricity. The method further comprises displaying, by the computational system, the candidate material to a user if the candidate material has superlubricity.

In some embodiments, a computational system for designing new materials having superlubricity comprises a user interface configured to receive an input from a user, a display, a memory, and a processing circuit comprising a processor. The processing circuit is configured to receive instructions for developing a computational supercell comprising x unit cells of a base material via the user interface, each unit cell comprising y atoms of the base material. The processing circuit is configured to develop the supercell. The processing circuit is configured to receive information corresponding to an impurity material via the user interface. The processing circuit is configured to replace randomly chosen z atoms of the base material with an impurity atom of an impurity material to form a candidate material. The processing system is configured to determine a volumetric strain of the candidate material. In response to the volumetric strain exceeding a predetermined threshold, the processing system is configured to determine that the candidate material has superlubricity and display the candidate material on the display.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 3A is schematic of the experimental setup, FIG. 3B shows graphs of the coefficient of friction, FIG. 3C shows wear of the ball.

FIG. 4A are schematics depicting the mechanism of OLC formation: 4A-I dispersion of $MoS_2$ and nanodiamonds on the surface, 4A-II wrapping of $MoS_2$ sheets around nanodiamonds, 4A-III partial disintegration of $MoS_2$ and amorphization of nanodiamond, and 4A-IV formation of OLCs.

FIG. 4C-F are transmission electron microscopy (TEM) images of the wear debris taken at regular intervals after interrupting the tribo-test and corresponding to four stages (FIG. 4A I-IV) of transformation. FIG. 4C indicates good dispersion of $MoS_2$ sheets along with nanodiamonds; FIG. 4D indicates initial breaking of $MoS_2$ layers and wrapping around nanodiamonds; FIG. 4E further wrapping of the $MoS_2$ layers around the nanodiamonds and reduction in the size of nanodiamonds due to the tribochemical reaction leading to amorphization and precipitation of amorphous carbon; and FIG. 4F shows complete transformation into OLCs in the wear track with no indication of $MoS_2$ layers inside the wear track. The presence of the initial mixture of diamond and $MoS_2$ and the OLC structures is indicated by interlayer spacing in the diamond lattice, as well as between $MoS_2$ and graphitic layers. The scale bars are 5 nm.

FIG. 7E are images of twelve points across the wear track for which LDSPI analysis performed. Increase in intensity for molecular sulfur $S_2$ peak at 64 atomic mass units (FIG. 7F) and molybdenum carbide ($Mo_2C$) peaks at 204 atomic mass units (FIG. 7G) indicates transformation of molybdenum and sulfur after disintegration of $MoS_2$. The samples were analyzed immediately after the test without cleaning. The scale bars are 50 µm.

FIG. 9A is a TEM image demonstrating the structure and the size of the OLCs deposited on the surface. FIG. 9B is a plot of COF for 5-7 nm OLC on silicon dioxide substrate sliding against DLC ball in dry nitrogen indicates high frictional values: 0.06+/−0.012. FIG. 9C is an image of wear of the ball side after the tribo-test indicates a wear volume of 1.48+/−0.28×$10^{-5}$ $mm^3$. FIG. 9D is a plot of COF for 5-7 nm OLC combined with $MoS_2$ flakes on silicon dioxide substrate sliding against DLC ball in dry nitrogen indicates high frictional values: 0.05+/−0.02. FIG. 9E is an image wear of the ball side after the tribo-test indicates wear volume of 2.96+/−0.47×$10^{-5}$ $mm^3$.

FIG. 11A is a scanning electron microscopy (SEM) image of the wear track and the corresponding Auger elemental maps of carbon (FIG. 11B), molybdenum (FIG. 11C), and sulfur (FIG. 11D) from the wear track and areas nearby.

FIG. 16A illustrates how Mo reacts with C atoms on the surface of diamond particle forming carbide, and induces amorphization at the surface at 2,000 K; (FIG. 16B) within molecular dynamic (MD) timescales. The amorphization front does not traverse the whole particle and remains restricted to the surface. Atomic snapshots are shown here at (FIG. 16A) t=0 and (b) t=1 ns. The C atoms are depicted as dark spheres, while Mo atoms are represented by light spheres. The formation of $Mo_2C$ is thermodynamically feasible under high local temperatures (near asperities) typically observed under dry sliding conditions.

FIGS. 17A-B illustrate movement of S atoms from the surface of the nanodiamond towards the core. FIG. 17A illustrates initial nanodiamond with S atom on the surface and FIG. 17B illustrates nanodiamond after S-induced lattice disordering. The corresponding insets show the disordering process. A slice through the sphere shows the evolution of the surface, as well as the bulk of the nanodiamond sphere. Zoomed in insets show the inward movement of a representative surface S atom (indicated by arrow). This inward S diffusion is accompanied by amorphization of the diamond lattice. The C and S atoms are depicted as darker and lighter spheres respectively.

FIGS. 18A-H are atomistic simulations of the tribochemical mechanism leading to reduction in friction. FIGS. 18A-18D are atomic snapshots from reactive molecular dynamic (RMD) simulations at selected times during the sulfur-induced amorphization of diamond nanoparticle. FIGS. 18E-18H are atomic snapshots from RMD simulations at selected times during the formation of OLC structures from amorphous carbon matrix containing uniformly dispersed S atoms (15% S concentration).

FIG. 19A are plots of pair distribution functions of C—C for each snapshot shown in FIGS. 18A and 18B, and FIG. 19B are plots of volumetric strains in the diamond lattice (Top) induced by substituting a C atom with different impurity atoms, and the corresponding defect energies $E_d$ (Bottom) obtained from DFT calculations. In FIG. 19B (Top), $\Delta V$ refers to change in the volume of diamond lattice owing to introduction of a substitutional defect, and $V_0$ refers to the volume of diamond lattice at equilibrium.

Figure 1:
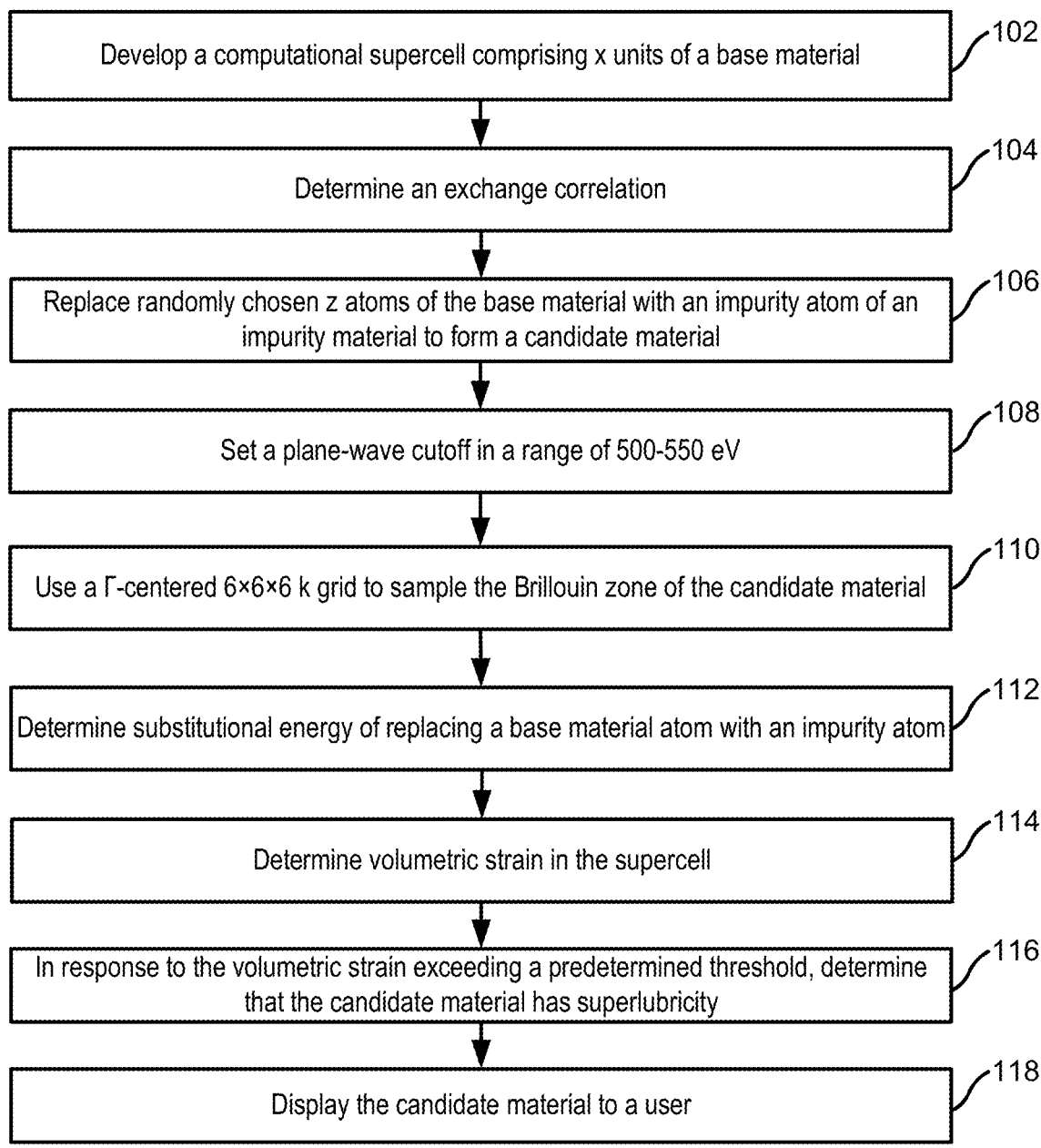
FIG. 1 is a schematic flow diagram of a method for designing materials having superlubricity, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for designing materials for superlubricity, and in particular, to computational systems and methods for designing new materials using volumetric strain as a predictor of superlubricity of the material.

As described herein, the term "superlubricity" and similar terms refer to a regime of motion in which friction vanishes or nearly vanishes, such as at a coefficient of friction (COF) of less than about 0.01.

Stress-induced reactions at the sliding interface during relative movement are known to cause structural or chemical modifications in contacting materials. The nature of these modifications at the atomic level and formation of byproducts in an oil-free environment, however, remain poorly understood and pose uncertainties in predicting the tribological performance of the complete tribo-system. It is estimated that nearly ⅓ of the fuel used in automobiles is spent to overcome friction, while the wear limits component life and reliability. Even a modest few percent reduction in friction can significantly impact energy security, energy savings and environmental benefits.

The conventional way for friction and wear reduction for most of the materials widely used in automotive industry is oil-based lubrication. Oil-based lubricants are however increasingly becoming a concern mainly because of their adverse environmental impacts (oil waste) and there are efforts being made to increase the durability of oil based lubricants by introducing some additives. Recent studies have explored tribo-film formation from zinc dithiophosphate-containing lubricant, where the growth of the tribofilm could be controlled by varying the compressive stress at the contact interface. Formation of diamond-like carbon films was also observed for catalytically reacting surfaces when sliding in oil.

Although such studies are encouraging, the reactions often require a substantial amount of reactive additives or liquid lubricant layer in the form of oil. The viscosity of the liquid also limits the ultimate low friction that can be achieved. It is, therefore, desirable to achieve ultralow friction and wear in dry conditions as well. In this context, the use of two dimensional (2D) materials such as graphene as a dry lubricant demonstrated recently is very promising. However, achieving superlubricity, or near-zero friction, at the macroscale sliding contact still remains a major challenge.

Embodiments of the systems and methods for designing new materials having superlubricity provides several benefits including, for example: (1) designing previously undiscovered material combinations having superlubricity without having to manufacture the material; (2) enabling discovery of novel solid state superlubricious materials; and (3) providing tremendous cost and time savings by allowing rapid discovery of materials by focusing developmental efforts on only those materials that are determined to be suitable candidates for superlubricity.

FIG. 1 is a schematic flow diagram of a method 100 for designing new materials for superlubricity, according to an embodiment. The method 100 may be implemented with a computational system, for example, the computational system 200 described with respect to FIG. 2. The method 100 includes developing, on a computational system, a computational supercell comprising x unit cells of a base material, at 102. Each unit cell comprises y atoms of the base material. In some embodiments, x may be from 1-10 (e.g., 1, 2, 3, 4, 5, 6, 7, 8, 9 or 10 unit cells) such that the total number of atoms in the computational system are less than 100 (e.g., for reasonable computational cost without compromising on accuracy), and y may be equal to x. For example, in a particular embodiment, the supercell may include 8 unit cells, each unit cell including 8 atoms for a total of 64 atoms in the supercell. The unit cell may correspond to the crystal structure of the base material. The supercell describes the same crystal structure as the unit cell but has a larger volume. In particular embodiments, the base material may comprise a carbonaceous material, for example, graphene, graphite, carbon black, diamond (e.g., nanocrystalline diamond, ultrananocrystalline diamond), or any other suitable carbonaceous material.

In some embodiments, the method may also comprise determining, by the computational system, an exchange correlation for replacing randomly chosen z atoms of the base material at 104. The chosen z atoms may include 1 or 2 atoms per unit cell. The exchange correlation is described by the Perdew-Burke-Ernzerhof (PBE) functional using pseudopotentials supplied by Vienna Ab initio Simulation Package (VASP) which is a computer program for atomic scale materials modelling, e.g., electronic structure calculations and quantum-mechanical molecular dynamics, from first principles.

At 106, the randomly chosen z atoms of the base material are replaced by the computational system with an impurity atom of an impurity material to form a candidate material. In some embodiments, the impurity material may comprise a phosphorene or a transition metal dichalcogenide (TMD), for example, of the type $MX_2$, with M a transition metal atom (Mo, W, etc.) and X a chalcogen atom (S, Se, or Te). Examples of TMDs includes $MoS_2$, $WS_2$, $MoSe_2$, $WSe_2$, $MoTe_2$, or any other TMD material. In particular embodiments, the base material may consist essentially of a carbon material, and the impurity material comprises one of a phosphorene or a TMD.

In some embodiments, the method 100 may also comprise setting, by the computational system, a plane-wave cut off in a range of 500-550 eV, at 108. The plane wave-cutoff may be based on the type and softness of a pseudopotential of the candidate material. At 10 a Γ-centered 6×6×6 k grid may be used by the computational system to sample the Brillouin zone of the candidate material. The Brillouin zone is a uniquely defined primitive cell in reciprocal space. In the same way the Bravais lattice is divided up into Wigner-Seitz cells in the real lattice, the reciprocal lattice is broken up into Brillouin zones.

In some embodiments, the method 100 may also comprise using periodic boundary conditions (PBCs), by the computational system, in all directions of the candidate material. PBCs are a set of boundary conditions which are often chosen for approximating a large (infinite) system by using a small part i.e., the unit cell. In particular embodiments, the method 100 may also include optimizing, by the computational system, atomic positions, a volume and a shape of the computational supercell until a total energy of the computation supercell converges to within 1 meV per atom.

In some embodiments, the method 100 may also include determining, by the computational system, a substitution energy for replacing an atom of the base material with an impurity atom, at 112. In various embodiments, the substitution energy may be determined from equation (1):

$$E_d = E_{def} - N_B E_B - N_i E_i \quad (1)$$

where $E_d$ is the substitution energy, $E_{def}$ is the total energy of defective configuration, $E_B$ is total energy (per base material atom) of pristine base material lattice, and $E_i$ is the total energy of an impurity atom in its reference state, while $N_B$ and $N_i$ are number of base material and impurity atoms, respectively.

At 114, a volumetric strain of the candidate material is determined by the computational system. In various embodiments, the volumetric strain may correspond to the substitution energy. In some embodiments, the volumetric strain may be determined by the computational system via density functional theory calculations performed within the generalized gradient approximation in the projector augmented plane wave formalism implemented in VASP.

At 116, if the volumetric strain exceeds a predetermined threshold, the computational system determines that the candidate material has superlubricity. In particular embodiments, the predetermined threshold corresponds to a volumetric strain of equal to or greater than 2%. The volumetric strain exceeding the volumetric threshold may correspond to the base material being amorphized which may yield superlubricity. At 118, the computational system displays the candidate material to a user if the candidate material has superlubricity. For example, the computational system may display a chemical or physical structure of the candidate material to a user on a screen. In some embodiments, the volumetric strain of the candidate material may meet or exceed the predetermined threshold but the substitution energy $E_d$ may be significantly higher. Such a candidate material may be superlubric under specific conditions, for example, under specific sliding rates, temperatures, pressures, etc.

Figure 2:
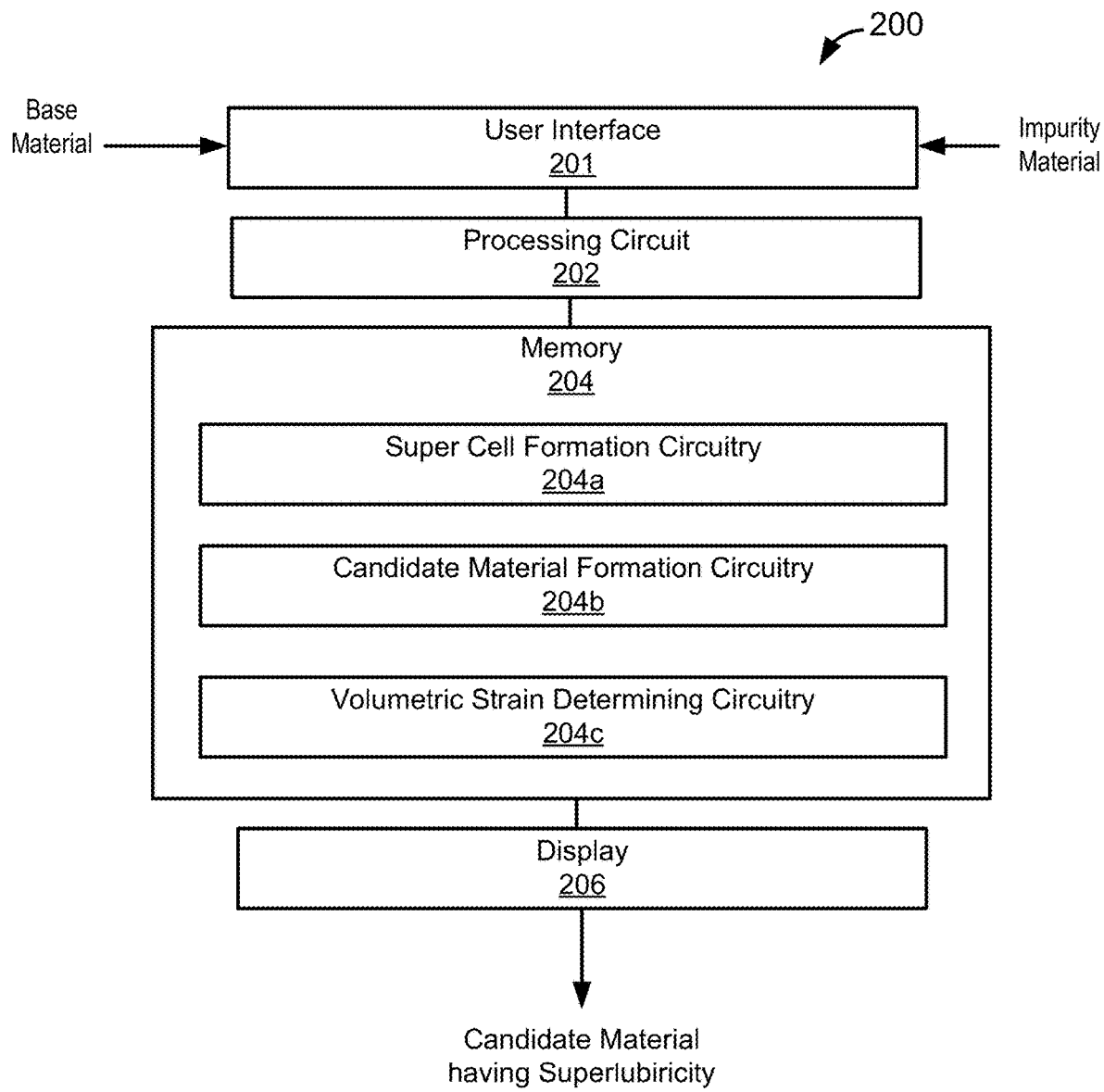
FIG. 2 is a schematic block diagram of a computational system configured to design materials having superlubricity, according to an embodiment.

FIG. 2 is a schematic block diagram of a computational system 200 for designing new materials having superlubricity, according to an embodiment. The computational system 200 comprises a user interface 201, a processing circuit 202, a memory 204, or any other computer readable medium, and a display 206. Furthermore, the computational system 200 may include a supercell formation circuitry 204a, a candidate material formation circuitry 204b and a volumetric strain determining circuitry 204c. It should be understood that the computational system 200 shows only one embodiment of the computational system and any other computational system capable of performing the operations described herein can be used.

The user interface 201 may include, for example, a keyboard, a mouse, a trackball, a touch screen, a joystick, or any other input device which may be used by a user to input information (e.g., data or parameters) into the computational system 200.

The processing circuit 202 can comprise a microprocessor, programmable logic controller (PLC) chip, an ASIC chip, or any other suitable processor. The processing circuit 202 is in communication with the memory 204 and configured to execute instructions, algorithms, commands, or otherwise programs stored in the memory 204.

The memory 204 comprises any of the memory and/or storage components discussed herein. For example, memory 204 may comprise a RAM and/or cache of processing circuit 202. The memory 204 may also comprise one or more storage devices (e.g., hard drives, flash drives, computer readable media, etc.) either local or remote to the computational system 200. The memory 204 is configured to store look up tables, algorithms, or instructions.

In one configuration, the supercell formation circuitry 204a, the candidate material formation circuitry 204b and the volumetric strain determining circuitry 204c include instructions that are executable by a processor, such as the processing circuit 202. As described herein and amongst other uses, the machine-readable media (e.g., the memory 204) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network.

The supercell formation circuitry 204a, the candidate material formation circuitry 204b and the volumetric strain determining circuitry 204c may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the supercell formation circuitry 204a, the candidate material formation circuitry 204b and the volumetric strain determining circuitry 204c may also include programmable hardware devices such as field programmable gate arrays, programmable array logic, programmable logic devices or the like. In this regard, the supercell formation circuitry 204a, the candidate material formation circuitry 204b and the volumetric strain determining circuitry 204c may include one or more memory devices for storing instructions that are executable by the processor(s) of, the supercell formation circuitry 204a, the candidate material formation circuitry 204b and the volumetric strain determining circuitry 204c. The one or more memory devices and processor(s) may have the same definition as provided below with respect to the memory 204 and the processing circuit 202.

In the example shown, the computational system 200 includes the processing circuit 202 and the memory 204. The processing circuit 202 and the memory 204 may be structured or configured to execute or implement the instructions, commands, and/or control processes described herein with respect to the supercell formation circuitry 204a, the candidate material formation circuitry 204b and the volumetric strain determining circuitry 204c. Thus, the depicted configuration represents the aforementioned arrangement where the supercell formation circuitry 204a, the candidate material formation circuitry 204b and the volumetric strain determining circuitry 204c are embodied as machine or computer-readable media. However, as mentioned above, this illustration is not meant to be limiting as the present disclosure contemplates other embodiments such as the aforementioned embodiment where the supercell formation circuitry 204a, the candidate material formation circuitry 204b and the volumetric strain determining circuitry 204c, or at least one circuit of the supercell formation circuitry 204a, the candidate material formation circuitry 204b and the volumetric strain determining circuitry 204c are configured as a hardware unit. All such combinations and variations are intended to fall within the scope of the present disclosure.

The processing circuit 202 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the supercell formation circuitry 204a, the candidate material formation circuitry 204b and the volumetric strain determining circuitry 204c) may comprise or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 204 (e.g., RAM, ROM, Flash Memory, hard disk storage, etc.) may store data and/or computer code for facilitating the various processes described herein. The memory 204 may be communicably connected to the processing circuit 202 to provide computer code or instructions to the processing circuit 202 for executing at least some of the processes described herein. Moreover, the memory 204 may be or include tangible, non-transient volatile memory or non-volatile memory. Accordingly, the memory 204 may include database components, object code components, script components, or any other type of information structure for supporting the various activities and information structures described herein.

The display 206 is configured to display information to a user, for example, display a candidate material having superlubricity and/or information being input by the user into the computational system 200 via the user interface 201. The display may include, for example, a liquid crystal display (LCD) screen, a plasma screen, a light emitting diode (LED) screen, an organic LED screen or any other suitable display.

The supercell formation circuitry 204a may be configured to receive instructions from the user, for example, via the user interface 201 for developing a computational supercell comprising x unit cells of a base material, and develop the supercell. Each unit cell comprises y atoms of the base material. In some embodiments, x may be from 1-10 (e.g., 1, 2, 3, 4, 5, 6, 7, 8, 9 or 10 unit cells), such that the total number of atoms in the computational system are less than 100 (e.g., for reasonable computational cost without compromising on accuracy) and y may be equal to x. For example, in a particular embodiment, the supercell may include 8 unit cells, each unit cell including 8 atoms for a total of 64 atoms in the supercell. The unit cell corresponds to the crystal structure of the base material. The supercell describes the same crystal structure as the unit cell but has a larger volume. In particular embodiments, the base material may comprise a carbonaceous material, for example, graphene, graphite, carbon black, diamond (e.g., nanocrystalline diamond, ultrananocrystalline diamond), or any other suitable carbonaceous material.

The candidate material formation circuitry 204b may be configured to receive information corresponding to an impurity material via the user interface 201 and replace randomly chosen z atoms of the base material with an impurity atom of the impurity material so as to form a candidate material. The chosen z atoms may include 1 or 2 atoms per unit cell. In some embodiments, the candidate material formation circuitry 204b may be configured to determine an exchange correlation for replacing the randomly chosen z atoms of the base material. The exchange correlation may be described by the Perdew-Burke-Ernzerhof (PBE) functional using pseudopotentials supplied by VASP.

In some embodiments, the impurity material may comprise a phosphorene or a transition metal dichalcogenide (TMD), for example, of the type $MX_2$, with M a transition metal atom (Mo, W, etc.) and X a chalcogen atom (S, Se, or Te). Examples of TMDs includes $MoS_2$, $WS_2$, $MoSe_2$, $WSe_2$, $MoTe_2$, or any other TMD material. In particular embodiments, the base material may consist essentially of a carbon material, and the impurity material comprises one of a phosphorene or a TMD.

The candidate material formation circuitry 204b may also be configured to set a plane-wave cut off in a range of 500-550 eV. The candidate material formation circuitry 204b may also be configured to use a Γ-centered 6×6×6 k grid to sample the Brillouin zone of the candidate material. Furthermore, the candidate material formation circuitry 204*b* may also be configured to use periodic boundary conditions (PBCs) in all directions of the candidate material. In particular embodiments, the candidate material formation circuitry 204*b* may also be configured to optimize atomic positions, a volume and a shape of the computational supercell until a total energy of the computation supercell converges to within 1 meV per atom.

The volumetric strain determining circuitry 204*c* may be configured to determine a volumetric strain of the candidate material. In some embodiments, the volumetric strain determining circuitry 204*c* may be configured to determine a substitution energy for replacing an atom of the base material with an impurity atom. In various embodiments, the substitution energy corresponds to the volumetric strain. In various embodiments, the substitution energy may be determined from equation (1), as previously described herein.

In some embodiments, the volumetric strain determining circuitry 204*c* may be configured to determine the volumetric strain via density functional theory calculations performed within the generalized gradient approximation in the projector augmented plane wave formalism implemented in VASP. The volumetric strain determining circuitry 204*c* may be configured to determine if the volumetric strain exceeds a predetermined threshold. In response to the volume strain exceeding the predetermined threshold, the volumetric strain determining circuitry 204*c* may be configured to determine that the candidate material has superlubricity. In particular embodiments, the predetermined threshold corresponds to a volumetric strain of equal to or greater than 2%. The volumetric strain exceeding the volumetric threshold may correspond to the base material being amorphized which may yield superlubricity. The computational system 200 may display the candidate material to a user on the display 206 if the candidate material has superlubricity. For example, the computational system 200 may display a chemical or physical structure of the candidate material to a user on the display 206.

Experimental Examples

Figure 3A:
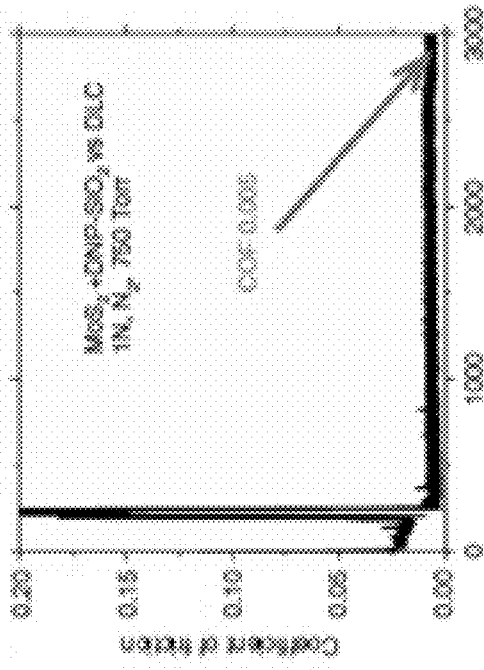
FIGS. 3A-3C show tribological performance of molybdenum disulfide ($MoS_2$) layers mixed with nano-diamond.

The superlubric friction is measured by sliding the 2-d material against a ball with a DLC surface. A ball 11 with a DLC surface 10 is shown in FIG. 3A. As shown in FIGS. 4A-4F (for MoS$_2$) the surface producing superlubric friction against a ball 11 with a DLC surface may include a flat substrate layer 10, 2-d material patches and 31 and nanoparticles, which in the current example include nanodiamonds 12, disposed over the substrate. A 2-d material layer may be disposed between the substrate 10 and the 2-d material patches 31.

Figure 6:
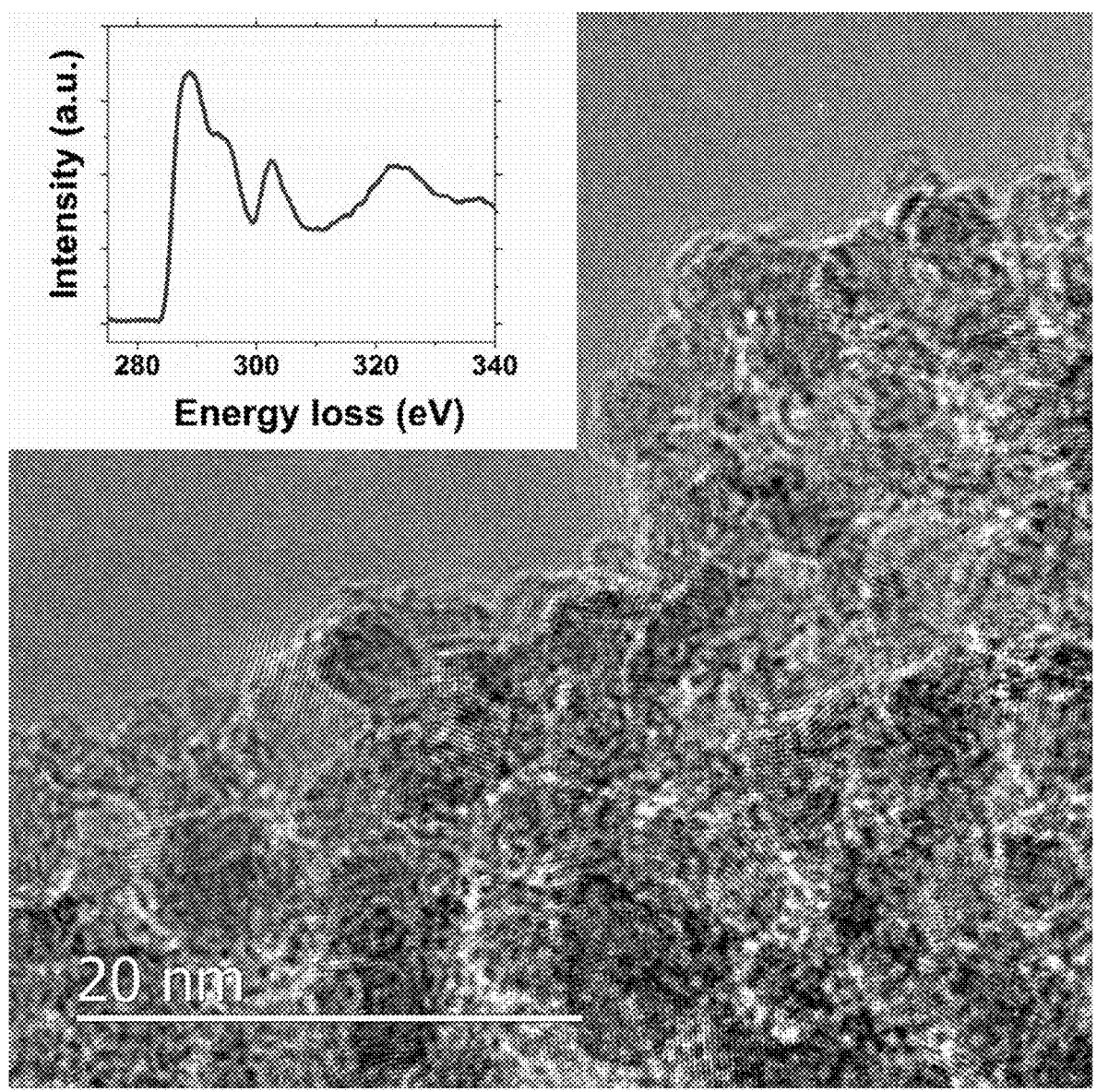
FIG. 6 is a TEM image of nanodiamonds formed from solution before the tribology tests with inset indicating typical EELS signature of nanodiamond, consisting predominantly $sp^3$ bonded carbon without any graphitic layers.

Preparation of Materials:

Solution-processed MoS$_2$ was prepared by chemical exfoliation of bulk MoS$_2$ crystal and was then suspended in ethanol with 18 mg/L graphene. The resulting solution contained 1-8 monolayers thick MoS$_2$ flakes. Next, diamond nanoparticles (nanodiamonds) of 3-5 nm diameter as shown in FIG. 6 were added into the solution in the proportion of 50-1,000 mg of nanodiamonds per liter of solution. The resulting solution after 20 min of sonication was deposited in a small amount (10-20 drops or 0.5-1 mL of solution per 10 cm$^2$) on a SiO$_2$ substrate in a colloidal liquid state, and the liquid ethanol was evaporated in dry nitrogen. This procedure resulted in few-layer-thick MoS$_2$ flakes (about 75% of the surface coverage with the estimated flakes size of 0.2-0.5 μm) and nanodiamonds non-uniformly covering the substrate. The expected number density of nanodiamonds per unit area of the substrate is in the range of 1,011-1,013 particles per cm$^2$, depending on the size of the nanodiamonds (3-5 nm). Commercially available onion-like carbons (OLCs), described below in further detail herein (Adamas Nanotechnologies, Inc.) were deposited on the silicon surface from the OLC-containing ethanol solution. In the ball-on-disk tests described below, the counterpart was a stainless steel ball (440C grade) of 9.5-mm diameter covered with a 1-μm-thick H-DLC layer of root mean square roughness $R_q$=20 nm. The DLC film was deposited by plasma-enhanced chemical vapor deposition at room temperature.

Tribological Tests:

Tribological tests were performed in dry nitrogen (900 mbar) and humid air (30% relative humidity) at room temperature using a CSM ball-on-disk macroscale tribometer. The normal load during the tribo-tests was kept at 1 N (Hertz contact pressure of 0.2 GPa), and the angular velocity was 60 rpm (0.6-0.9 cm/second where the radius of the wear track varied from 1 up to 15 mm). Zero calibration of the machine was performed automatically at the beginning of each test. All the tests were repeated at least five times to confirm reproducibility of the results. The error bars are calculated based on the variations between the tests. The wear volume of the flat was very difficult to assess, as wear was manifested as deep scratches and could not be fit into a reliable wear equation. To estimate the wear volume for the balls after the tribo-tests, the following equation was used:

$$V = \left(\frac{\pi h}{6}\right)\left(\frac{3d^2}{4} + h^2\right) \quad (2)$$

where $$h = \sqrt{r^2 - \frac{d^2}{4}},$$

d is wear scar diameter, and r is the radius of the ball.

Figure 3B:
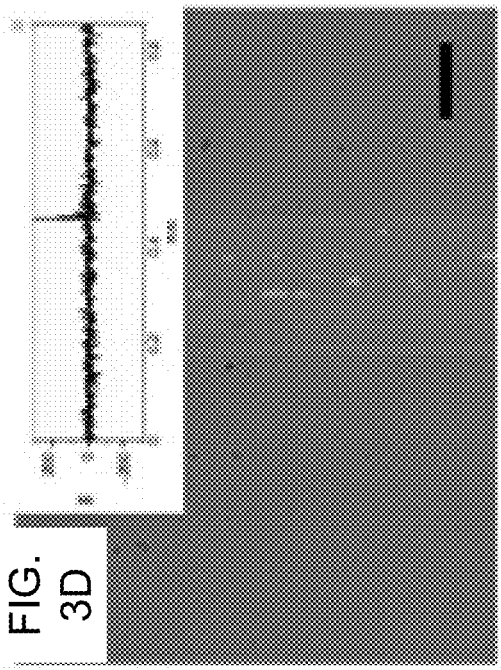
Figure 3C:
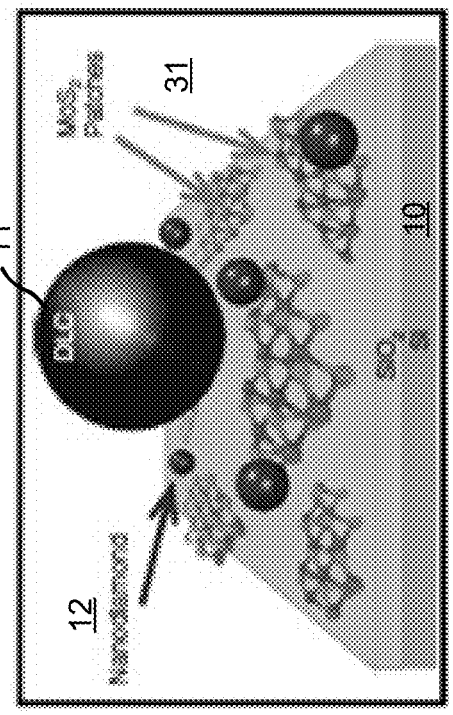
Figure 3D:
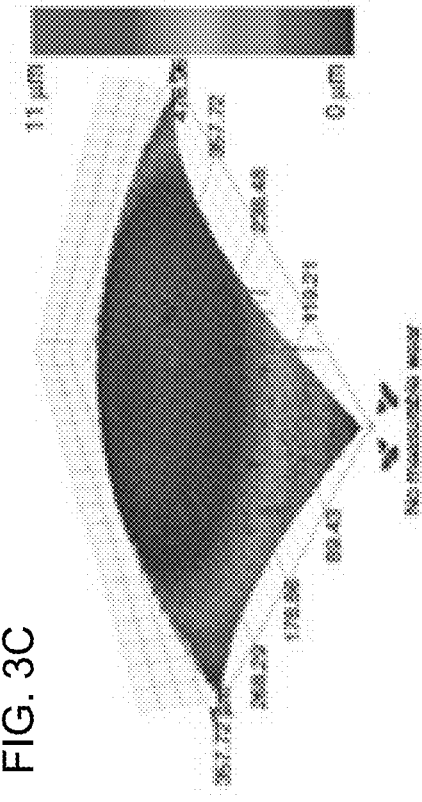
FIG. 3D is a micrograph of flat sides for $MoS_2$ mixed with nano-diamond and sliding against hydrogenated-diamond like carbon (H-DLC) surface. Negligible wear is indicated by line scan taken across the wear track (inset). The lowest coefficient of friction observed is 0.005±0.002. The test was repeated five times with the measurement uncertainty calculated based on the variations among the tests. The scale bar in FIG. 3D is 100 µm.

Friction and Wear Studies:

FIG. 3A-D show tribological performance of MoS$_2$ layers 31 mixed with nano-diamond 12. FIG. 3A is schematic of the experimental setup, FIG. 3B shows graphs of the coefficient of friction. FIG. 3C shows wear of the ball 11, and FIG. 3D is a micrograph of flat sides for MoS$_2$ mixed with nano-diamond and sliding against H-DLC surface. Negligible wear is indicated by line scan taken across the wear track (inset). The lowest coefficient of friction observed is 0.005±0.002. The test was repeated five times with the measurement uncertainty calculated based on the variations among the tests. The scale bar in FIG. 3D is 100 μm. Thus, FIG. 3 demonstrates the tribo-system tested including the initial configuration (FIG. 3A) and highlights the observed near-zero coefficient of friction (COF), reaching as low as 0.005 (FIG. 3B) with negligible wear on the ball 11 (FIG. 3C) and flat surface 10 (FIG. 3D). The flat mark observed on the ball side is associated with contact pressure-induced deformation (the Hertz contact diameter is approximately 86 μm) and is not due to the wear. Material buildup on the flat side is associated with the formation of OLCs inside the wear track.

Mechanism of Onion Like Carbon Formation—TEM/EELS Studies:

The wear scars were imaged with an Olympus UC30 microscope and characterized by an Invia Confocal Raman microscope using the red laser light (λ=514 nm). The wear debris formed during the tribo-tests was imaged with a JEOL JEM-2100F transmission electron microscope, for which samples were picked up from the wear track with a probe and transferred to a copper grid. Laser desorption analysis was performed with a home-built, time-of flight mass spectroscopy SARISA (surface analysis by resonant ionization of sputtered atoms) instrument.

Figure 4A:
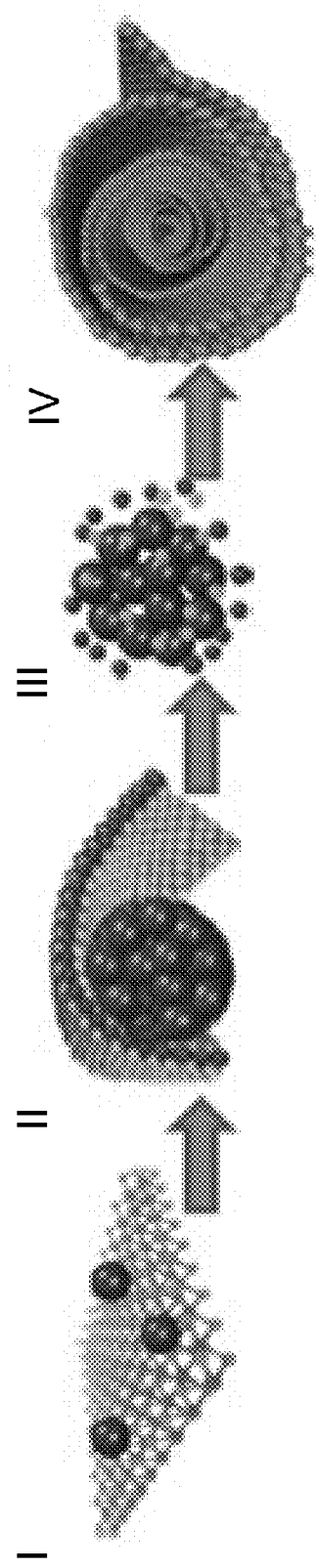
FIG. 4A shows schematics of the mechanism of the onion-like carbon (OLC) formation during sliding.

FIG. 4A shows schematics of the mechanism of the OLC formation during sliding. FIG. 4A are schematics depicting the mechanism of OLC formation: FIG. 4A-I dispersion of $MoS_2$ and nanodiamonds on the surface, FIG. 4A-II wrapping of $MoS_2$ sheets around nanodiamonds, FIG. 4A-III partial disintegration of $MoS_2$ and amorphization of nanodiamond, and FIG. 4A-IV formation of OLCs. The observations suggest a tribochemically driven mechanism of OLCs formation in the tribo-layer from a mixture of $MoS_2$ with nanodiamonds at sliding interfaces as shown in the schematics in FIGS. 4A I-IV leading to decreased friction values from high values down to near zero.

The evolution of $MoS_2$ and nanodiamonds leading to formation of OLC structures while sliding against H-DLC interfaces may occur via the following pathway: $MoS_2$ patches with high elastic bending modulus (by a factor of 7 higher than for graphene) between the sliding interfaces start to form scrolls around small clusters of nanodiamonds, as shown in FIGS. 4A I-II. This condition is clearer from the transmission electron microscopy (TEM) images taken on the wear debris collected from the wear track after specific wear cycles, as shown in FIGS. 4C-4F. FIG. 4C indicates good dispersion of $MoS_2$ sheets along with nanodiamonds. FIG. 4D shows initial breaking of $MoS_2$ layers and wrapping around nanodiamonds. FIG. 4E shows further wrapping of the $MoS_2$ around the nanoparticles and reduction in the size of nanodiamonds due to the tribochemical reaction leading to amorphization and precipitation of amorphous carbon. FIG. 4F shows complete transformation of the nanodiamond into OLCs in the wear track with no indication of $MoS_2$ layers inside the wear track. The presence of the initial mixture of diamond and $MoS_2$ and the OLC structures is indicated by interlayer spacing in the diamond lattice, as well as between $MoS_2$ and graphitic layers. The scale bars are 5 nm.

Figure 5B:
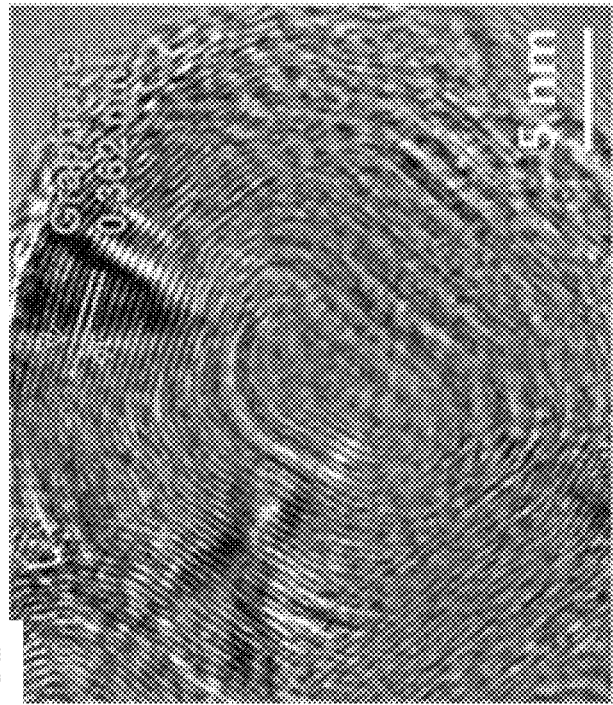
FIG. 5A-B are TEM observation of the wear debris indicating partial graphitization of the scroll shell with the core being amorphized (FIG. 5A), followed by eventual formation of a fully ordered OLC structure (FIG. 5B). The intermediate state in transformation when diamond is partially graphitized is very difficult to observe because, once disintegration of $MoS_2$ occurs, the following graphitization proceeds immediately.
Figure 5A:
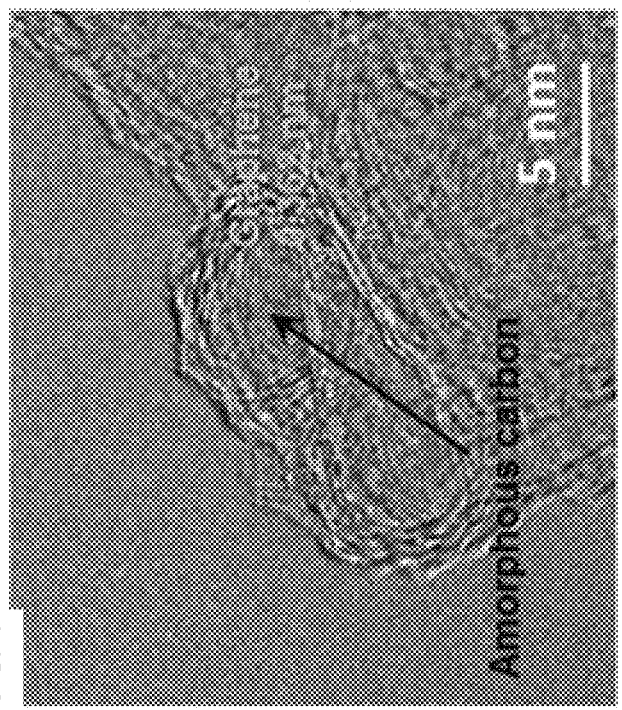

As the sliding proceeds, due to the high contact pressure (~0.2 GPa), $MoS_2$ starts to disintegrate into molybdenum and sulfur, and due to the high affinity of sulfur toward oxygen, it bonds to the oxygenated nanodiamond surface. The nanodiamonds produced from this detonation process are known to have carboxyl and oxygenated species on the surface. The diffusion of sulfur into the nanodiamond then takes place due to the stress-induced chemical reaction, which exhibits transformation from $sp^3$-bonded diamond into $sp^2$-bonded amorphous carbon and then eventually into graphitic layers in the form of OLCs, as shown by schematics in FIGS. 4A I-IV and the corresponding TEM images in FIGS. 4C-F. FIGS. 5A-B are TEM images of wear debris indicating partial graphitization of the scroll shell with the core being amorphized (FIG. 5A), followed by eventual formation of a fully ordered OLC structure (FIG. 5B). The intermediate state in transformation when diamond is partially graphitized is very difficult to observe because, once disintegration of $MoS_2$ occurs, the following graphitization proceeds immediately. Interestingly, once disintegration of $MoS_2$ occurs, amorphization and graphitization proceed immediately. Though at 300 cycles, the observed TEM image indicates beginning of the amorphization of nanodiamonds, coefficient of friction approaches low values with some variations. This effect is attributed to the TEM capturing only partial amount of the wear debris and certain amount of graphitization may have already started at this point.

Figure 4B:
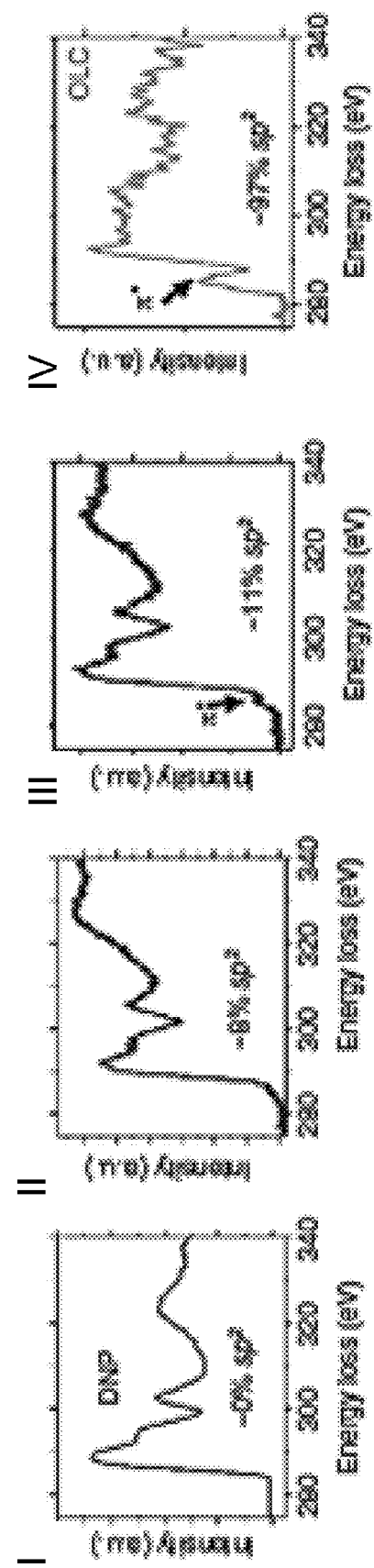
FIG. 4B I-IV are electron energy loss spectra highlighting the calculated fraction of $sp^2$-bonded carbon and tracking full transformation from nanodiamonds (FIG. 4B-I) into partially graphitized (4B-II), structures (4B-III) and into OLC structures (4B-IV).

FIGS. 4B V-VIII are electron energy loss spectra highlighting the calculated fraction of $sp^2$-bonded carbon and tracking full transformation from nanodiamonds (FIG. 4B-I) into partially graphitized (4B-II), structures (4B-III) and into OLC structures (4B-IV). Electron energy loss spectra (EELS) confirm the systematic evolution (with increasing $sp^2$ fraction) in the structure of wear debris from nanodiamond (FIG. 4B I-IV) into OLC (FIG. 4B IV), which agrees with the TEM images shown in FIGS. 4C-4F. Initially, due to the $sp^3$-bonded nature of the carbon in the detonated nanodiamonds, EELS spectra indicate almost no presence of the π*peak (at about 285 eV) in the carbon K-edge spectra, as shown in FIG. 6. FIG. 6 is a TEM image of nanodiamonds formed from solution before the tribology tests with inset indicating typical EELS signature of nanodiamond, consisting predominantly $sp^3$ bonded carbon without any graphitic layers.

After conversion of nanodiamond into OLC structures, emergence of $sp^2$-bonded carbon π*peak (FIG. 4B-III) leading to fully $sp^2$ bonded OLC structure (FIG. 4B-IV) was observed. The corresponding $sp^2$ fraction for every stage of transformation was calculated based on the position and intensity of the π*peak. The interaction of $MoS_2$ edge atoms with the dangling bonds on the nanodiamond surface may also be helping to form a scroll around the nanodiamond, as was previously observed with a graphene-forming scroll around nanodiamond. Once the nanodiamonds are fully converted into carbon nano-onions, they slide against the H-DLC surface, thus reducing the contact area and with minimal mechanical energy dissipation due to the incommensurate sliding interface between them resulting in a dramatic decrease in friction, as described in detail in U.S. patent application Ser. No. 15/428,387, filed Feb. 19, 2017 ad entitled "Low Friction Wear Resistant Graphene Films," the entire disclosure of which is incorporated herein by reference.

Figure 9A:
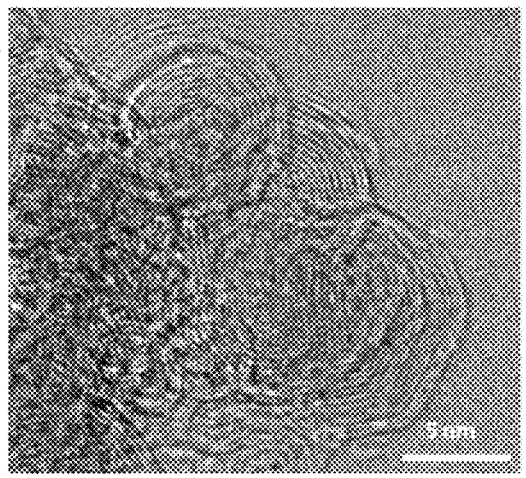
FIGS. 9A-E are tribological performance of small manually supplied OLCs.
Figure 9B:
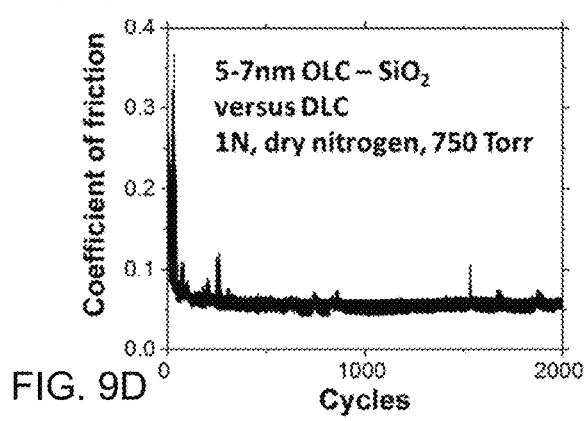
Figure 9C:
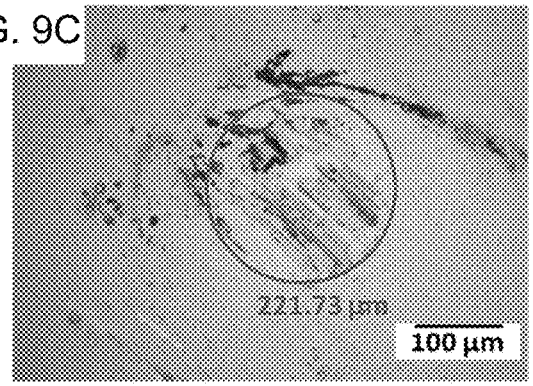
Figure 9D:
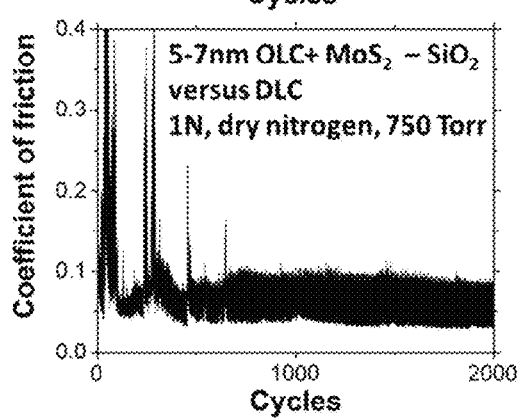
Figure 9E:
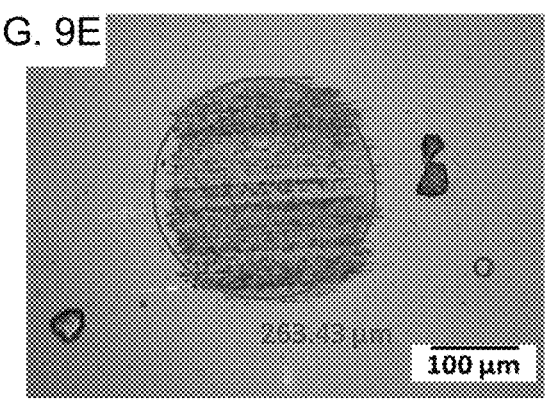

Interestingly, dispersing the surface with only $MoS_2$ flakes without the nanodiamond, but in presence of carbon-rich DLC counterpart surface did not result in the superlubricity. To further elaborate the importance of the nanodiamond+$MoS_2$ combination for successful OLC formation and thus near-zero COF, a test for pure $MoS_2$ sliding against the DLC surface was performed, which is shown in FIG. 6. In this case limitation of free carbon suppresses formation of OLC and results in the high COF. Also, to demonstrate the uniqueness of forming large OLC structures for demonstrating ultra-low friction, a tribo-test was performed with small 5-7 nm OLCs shown in FIG. 9A. FIG. 9A is a TEM image demonstrating the structure and the size of the OLCs deposited on the surface. FIG. 9B is a plot of COF for 5-7 nm OLC on silicon dioxide substrate sliding against DLC ball in dry nitrogen and indicates high frictional values of 0.06+/−0.012. FIG. 9C is an image of wear of the ball side after the tribo-test which indicates a wear volume of $1.48+/−0.28 \times 10^{-5}$ $mm^3$. FIG. 9D is a plot of COF for 5-7 nm OLC combined with $MoS_2$ flakes on silicon dioxide substrate sliding against DLC ball in dry nitrogen which indicates high frictional values of 0.05+/−0.02. FIG. 9E is an image wear of the ball side after the tribo-test and indicates wear volume of $2.96+/−0.47 \times 10^{-5}$ $mm^3$.

The tests for bare small OLC (FIGS. 9B and 9C) as well as for small OLCs combined with $MoS_2$ (FIGS. 9D and 9E) revealed comparably low friction, although not in the superlubricity regime. These results demonstrate the necessity for forming larger structures in-situ to promote near zero friction. As demonstrated by molecular dynamic (MD) simulations described in detail below, the large OLC structures show higher stability. Mixing small OLC with $MoS_2$ is also not efficient for forming large stable onions due to limitations of available carbon source, or for forming $MoS_2$ scrolls due to the absence of dangling bonds in OLC to initiate the scrolling. Also, for the case of manually supplied OLC, the produced wear of the H-DLC ball is also larger than the wear for the superlubricity case described in the main manuscript.

Figure 8A:
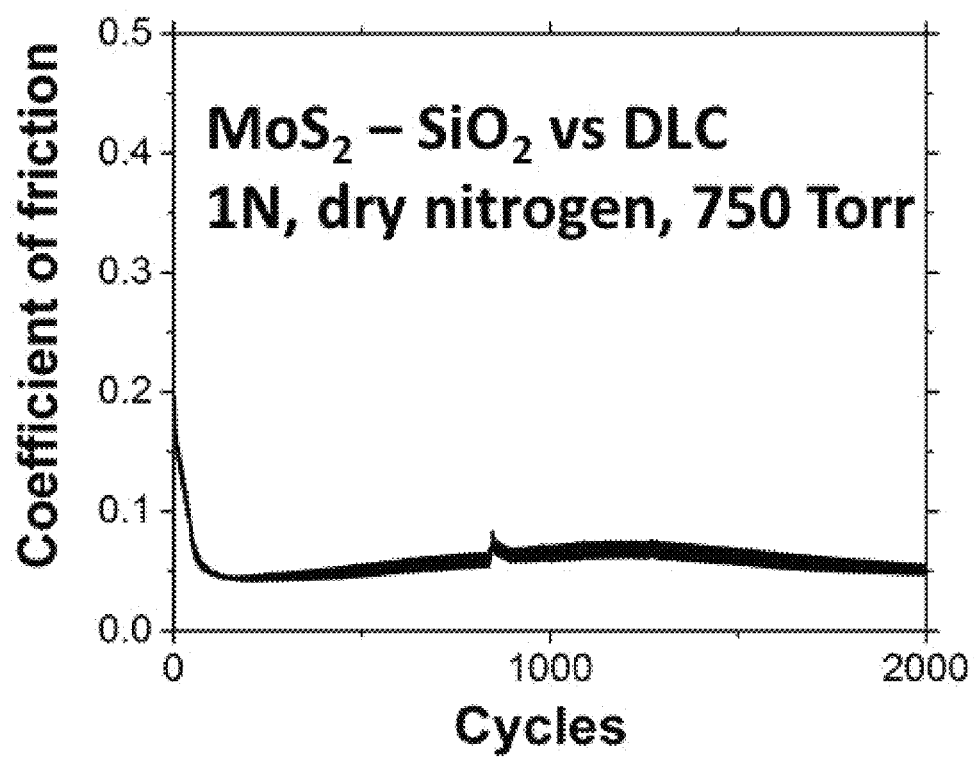
FIG. 8A is a plot of coefficient of friction for $MoS_2$ on silicon dioxide substrate sliding against DLC ball in dry nitrogen conditions.
Figure 8B:
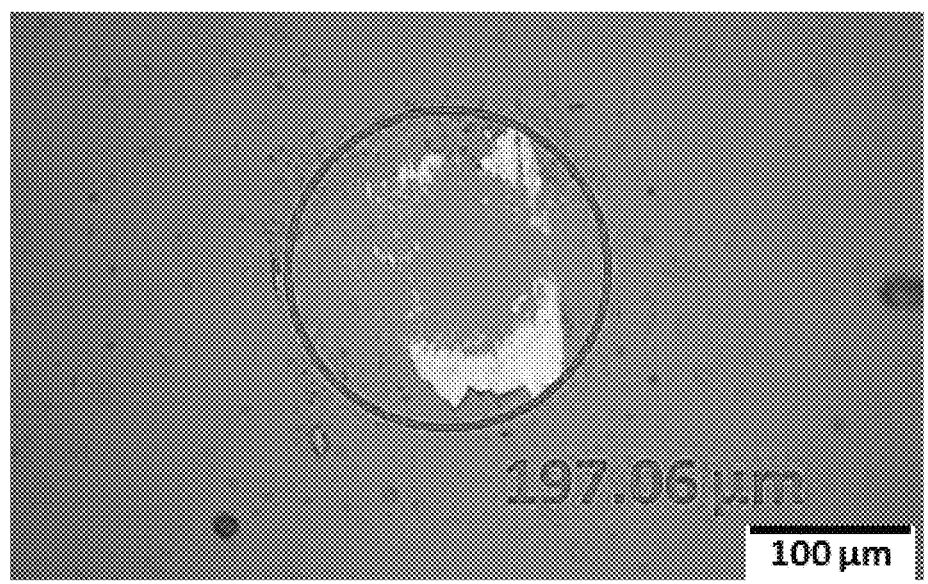
FIG. 8B is an image of the wear of the ball side after the test.

FIG. 8A is a plot of coefficient of friction for $MoS_2$ on silicon dioxide substrate sliding against DLC ball in dry nitrogen conditions, and FIG. 8B is an image of the wear of the ball side after the test. The bare $MoS_2$ showed at least 10 times higher friction (COF: 0.05±0.01) with high wear on the H-DLC ball side as shown in FIGS. 8A and 8B. Commercially available small diameter (5-7 nm) OLCs (Adámas Nanotechnologies, Inc.) were also dispersed directly at the interface in bare form or in combination with $MoS_2$, but the OLCs did not demonstrate superlubricity and were worn out from the wear track in either case (FIGS. 9A-E). The high friction with these OLCs is attributed to their being only a few layers thick (5-7 layers), as shown in FIG. 9A, as compared to the in situ produced multilayers (15-20 layers) of OLCs in the previous case shown in FIG. 4C. At such low layer thickness, the overall stiffness of the OLC is expected to be not high enough to withstand high contact pressures and shear stresses at the interface. As a result, they buckle during sliding, increasing the contact areas and hence displaying relatively higher friction. By contrast, the multilayered OLCs survive high contact pressure due to their higher stiffness. On the basis of MD simulations, this subtle relationship in the stiffness is explained with respect to the number of graphitic layers.

Figure 10:
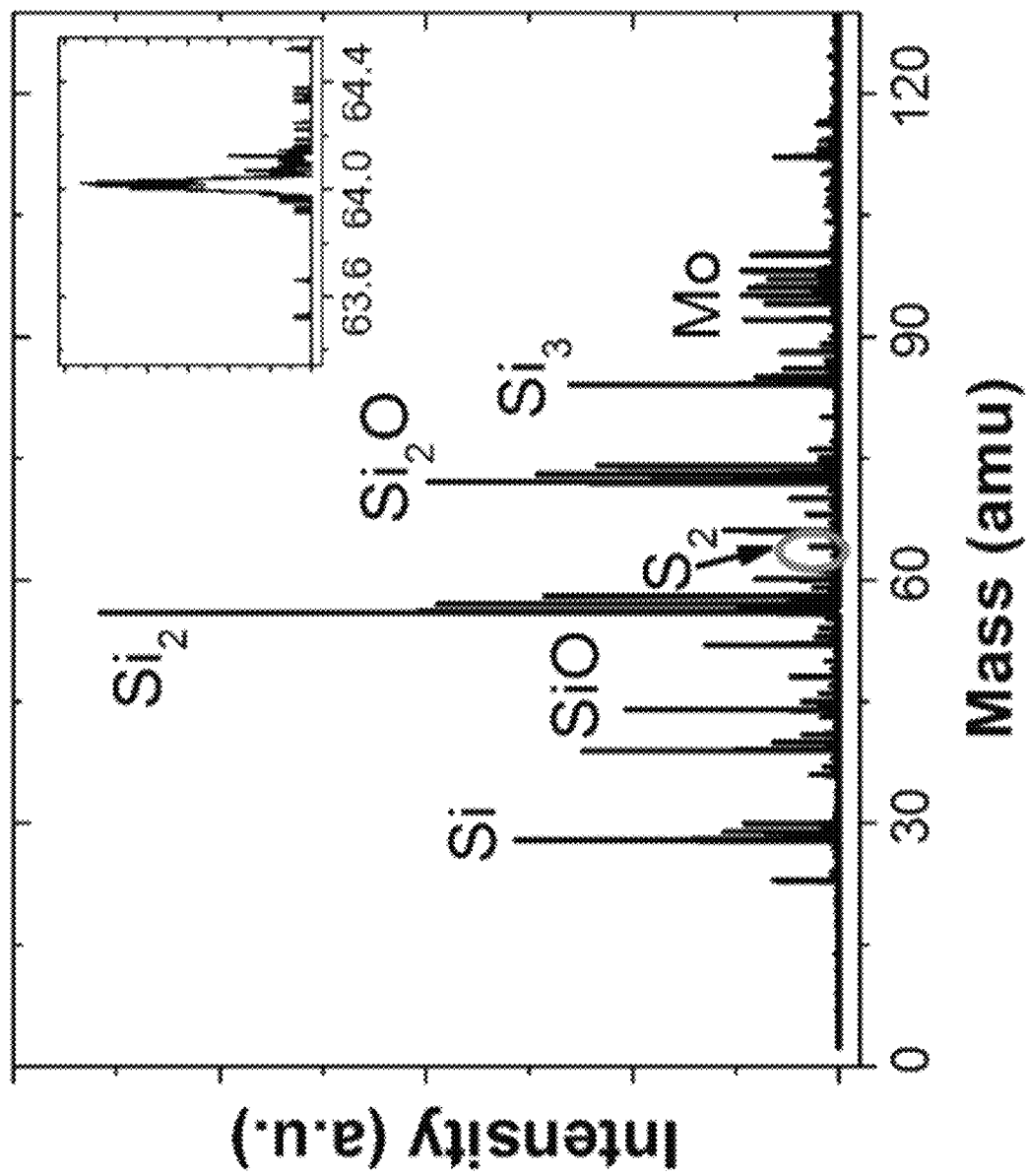
FIG. 10 is a plot of laser desorption of spray post ionization (LDSPI) spectroscopy analysis of the wear track highlighting position of sulfur peak, with inset indicating detailed scan for sulfur.

Raman Spectroscopy and LDSPI Studies:

To gain further insight into the evolution of the carbon-based tribo-layer within the wear track and identify the chemical state of the $MoS_2$, Raman spectroscopy studies and time-of-flight laser desorption single photon ionization (LDSPI) analysis of the wear track was performed. The LDSPI analysis is a very sensitive technique, detecting elemental compositions down to the parts per billion (ppb) level without the risk of modifying the surface (such as alloying) as it employs gentle laser desorption as opposed to the ion-beam induced sputtering used traditionally with time-of-flight secondary ion mass spectroscopy (ToF-SIMS). Laser desorption single photon ionization analysis was performed with a laser post-ionization secondary neutral mass spectrometry instrument operated in the laser desorption mode using the second harmonic of Ti:sapphire (370 nm wavelength, 14 ns pulse duration). The desorption laser pulses were focused onto the front side of the target, with the use of an instrument-embedded microscope, into a spot of about 7-micron diameter. An $F_2$ laser (GAM 100EXF, $\lambda$=157 nm, 10 ns pulse duration, 2 mJ per pulse energy) was used to photoionize the desorbed species in the plume with the delay of 2,000 ns against the desorption laser pulse. Ionized atoms and molecules were collected by front optics and analyzed by a time-of-flight mass spectrometer. The instrument was operated with 200 Hz repetition rate. The target was positioned on the in situ nano-motion stage, and the analysis was performed at several points by moving the target across the desorption laser beam in increments of 20 μm. Each mass spectrum was the sum of 1,024 laser shots acquired by a fast digitizer. Considering the Poisson statistics of the signal, the error bars in FIGS. 7F and 7G were calculated as the square root of the signal. Each point on FIG. 10 is the result of integration of appropriate mass signal in the spectrum over the mass in the range $M_{max} \pm \Delta M$, where $M_{max}$ is the mass that corresponds to the peak maximum, and $\Delta M$ denotes the signal drop to 10% of its maximum.

Figure 7A:
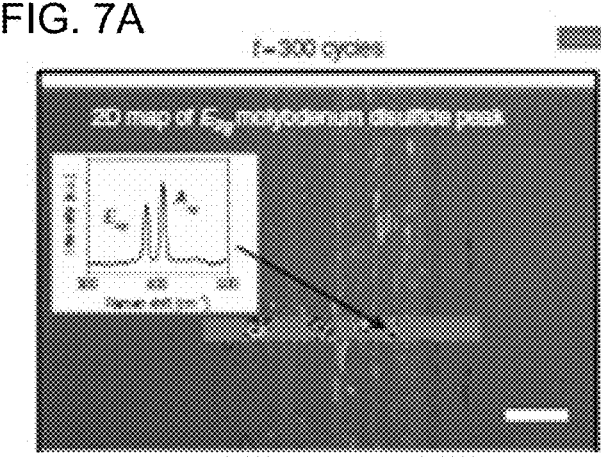
FIG. 7A-G are images of surface analysis of the wear track. Raman 2D mapping of the wear track for the characteristic $E_{2g}$ peak (at about 383 $cm^{-1}$) of $MoS_2$ and characteristic G peak (at about 1,600 $cm^{-1}$) of carbon-layered structures after initial 300 cycles (FIGS. 7A and 7C) and 3,000 cycles (FIGS. 7B and 7D). Insets demonstrate typical $MoS_2$ (FIGS. 7A and 7B) and graphitic carbon (FIGS. 7C and 7D) signatures inside the wear track.
Figure 7B:
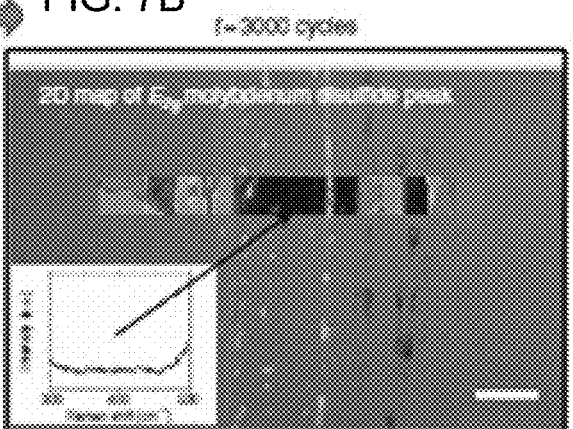
Figure 7C:
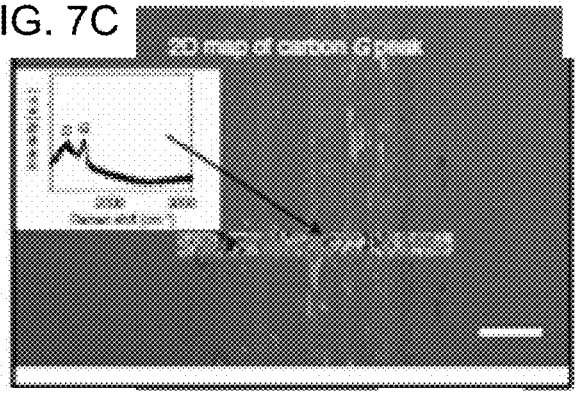
Figure 7D:
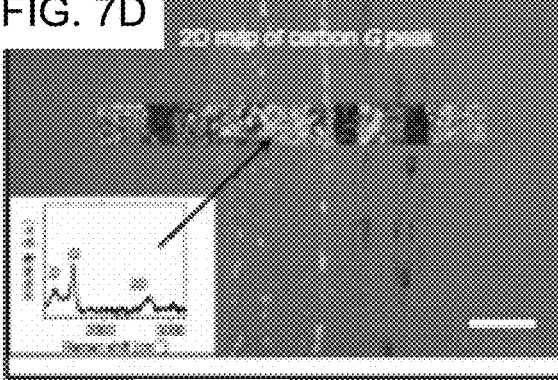
Figure 7E:
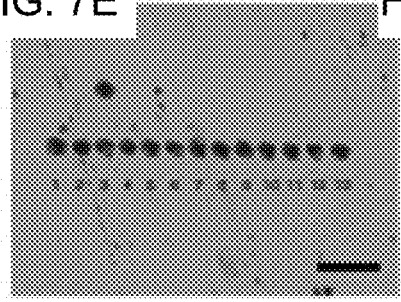

FIGS. 7A-7G are images of surface analysis of the wear track. Raman 2D mapping of the wear track for the characteristic $E_{2g}$ peak (at about 383 cm$^{-1}$) of $MoS_2$ and characteristic G peak (at about 1,600 cm$^{-1}$) of carbon-layered structures after initial 300 cycles (FIGS. 7A and 7C) and 3,000 cycles (FIGS. 7B and 7D). Insets demonstrate typical $MoS_2$ (FIGS. 7A and 7B) and graphitic carbon (FIGS. 7C and 7D) signatures inside the wear track. FIG. 7E are images of twelve points across the wear track for which LDSPI analysis is performed. Increase in intensity for molecular sulfur $S_2$ peak at 64 atomic mass units (FIG. 7F) and $Mo_2C$ peaks at 204 atomic mass units (FIG. 7G) indicates transformation of molybdenum and sulfur after disintegration of $MoS_2$. The samples were analyzed immediately after the test without cleaning. The scale bars are 50 μm.

As shown in FIGS. 7A and 7C, the Raman 2D mapping of the characteristic $E_{2g}$ peak for $MoS_2$ (at about 383 cm$^{-1}$) and the G peak for carbon structures (at about 1,600 cm$^{-1}$) after initial 300 wear cycles indicates uniform distributions of carbon and $MoS_2$ patches inside the wear track similar to the ones on the unworn surface outside the wear track. However, after 3,000 cycles, when TEM analysis shows no traces of $MoS_2$ in the form of two-dimensional layers, Raman mapping of the $E_{2g}$ characteristic $MoS_2$ peak shows no $MoS_2$ in the center of the wear track, and Raman mapping shows increased intensity of the carbon G peak at the center of the wear track compared to that of the unworn surface (FIGS. 7B and 7D). This higher G peak indicates formation of sp$^2$-bonded carbon in the wear track, as one would expect from the graphitization of the sp$^3$-dominated nanodiamond structure. The LDSPI analysis was performed at twelve points across the wear track, as shown in the optical image of FIG. 7E.

Figure 7F:
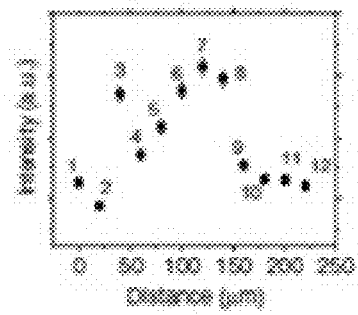
Figure 7G:
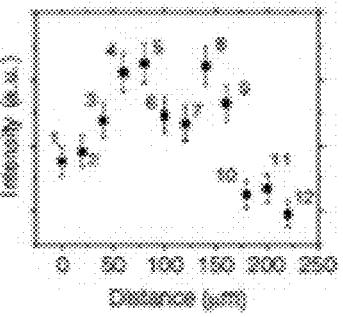

The resulting data further support the observation that $MoS_2$ disintegrates during the sliding test possibly under high shear and high mechanical stress conditions as a consequence of subtle changes in the molybdenum, sulfur, and carbon compositions (FIG. 7E-G). No sulfur atom signal (at 32 atomic mass unit (amu)) was detected across the wear track, whereas a signal at mass 64 amu, attributable to the sulfur molecule $S_2$, was clearly observed, as shown in FIG. 10. This result is not surprising because of the high ionization potential and low ionization probability of S in comparison with $S_2$. FIGS. 7F and 7G illustrate the variation of the $S_2$ peak and $Mo_2C$ signals, respectively, when analysis spots are rastered point-by-point across the wear track. The $S_2$ and $Mo_2C$ signals increase inside the wear track in comparison with the outside area, suggesting the formation of free sulfur (presumably in the form of $S_2$) and $Mo_2C$ molecules during the wear test. Note that although increased $S_2$ and $Mo_2C$ signals within the wear track were observed with LDSPI, it is quite insignificant at the TEM scale (unless aberration-corrected high resolution TEM is used).

Auger and X-Ray Photon Spectroscopy:

In order to further investigate disintegration of $MoS_2$ within the wear track and determine the final fate thereof, a combination of electron and X-ray analysis techniques was employed. Auger spectroscopy analysis is performed by a PE/PHI (Perkin-Elmer) model SAM 660 system with a single pass cylindrical mirror analyzer. For in-depth elemental analysis of the wear track the samples were sputtered with a differentially pumped 1-5 keV argon ion gun every for 12 second periods of time and the following Auger spectrum is acquired. X-ray photoelectron spectroscopy analysis (XPS) is performed with a PE/PHI model 5400 XPS system equipped with hemispherical energy analyzer operated at a pass energy of 17.9 eV. The system used Mg Kα radiation (400 W, 15 kV).

Auger electron spectroscopy (AES) was used for elemental mapping during depth profiling of the wear track. X-ray photoelectron spectroscopy (XPS) was used for characterizing the chemical state of the wear track. Given the atomically thin nature of $MoS_2$ flakes, AES and XPS nicely complement each other in terms of overcoming their sensitivity limitations thus enabling detection of elemental composition and surface chemistry on the very top surface and at the bottom of the wear track. The reference SEM image of the wear track and the corresponding Auger elemental maps of carbon, molybdenum, and sulfur from the wear track are shown in FIGS. 11A-D, respectively, indicating high concentration of carbon in the wear track with weak contribution from the molybdenum and sulfur in the sampling area. Considering the typical sampling depth in AES of about 5 nm the distribution of elements detected could be within this range.

Figures 12A, 12B:
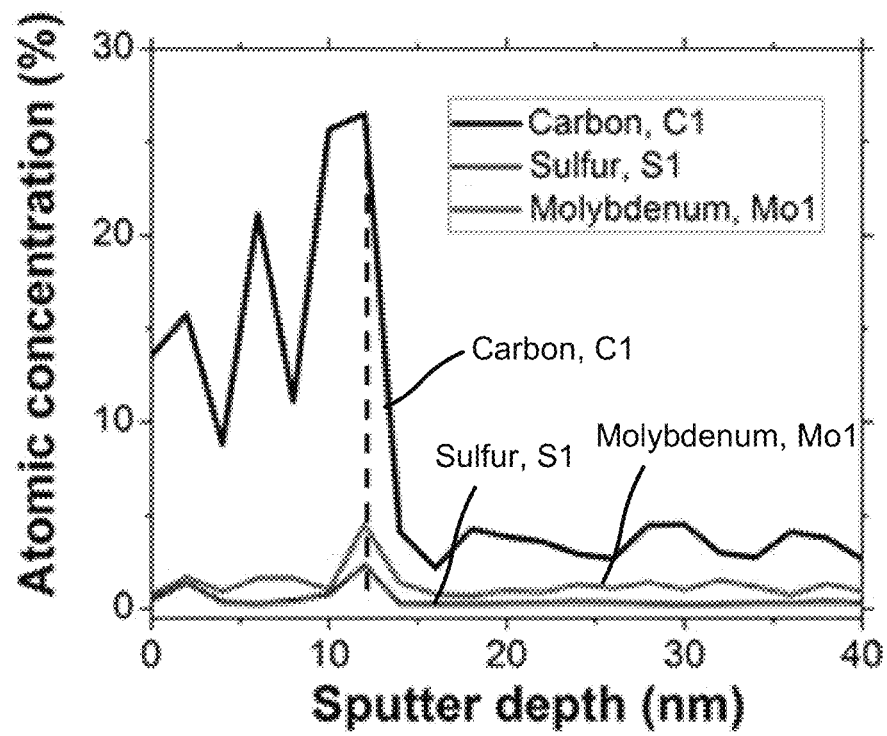
FIG. 12A is a plot of auger depth profile of the wear track for carbon, sulfur and molybdenum (dotted line indicates an approximate thickness of the tribo-layer).
FIG. 12B is a list of corresponding atomic percentage of various elements probed from inside and outside of the wear track.

The Auger elemental depth profiling within the wear track and corresponding atomic percentage of various elements probed from inside and outside of the wear track are shown in the FIGS. 12A-12B. The dotted line in FIG. 12A represents the approximate thickness of the tribo-layer. It is interesting to see that molybdenum and sulfur are sitting at the bottom of the wear track in very small quantity which supports earlier prediction and LDSPI data. Low signal of the sulfur inside the wear track indicates that most of the sulfur is consumed in the tribo-catalytic activity when converting nanodiamonds into OLCs and only residual sulfur finally settles down at the bottom of the wear track.

Figure 13A:
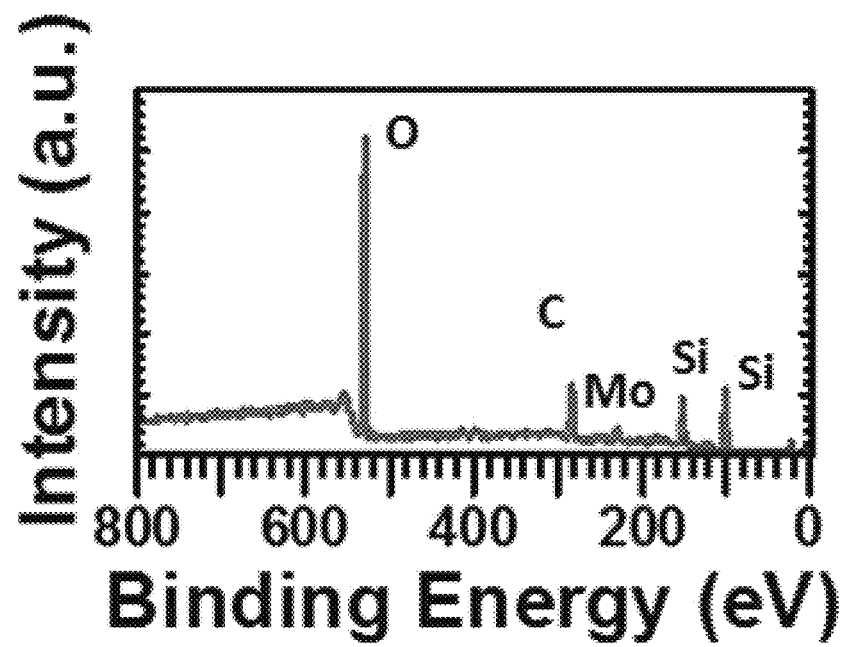
FIG. 13A is a X-ray photon spectroscopy (XPS) survey scan and FIG. 13B is a high resolution scan at C1s edge indicating presence of oxygen, chemically bonded to the carbon inside the wear track.
Figure 13B:
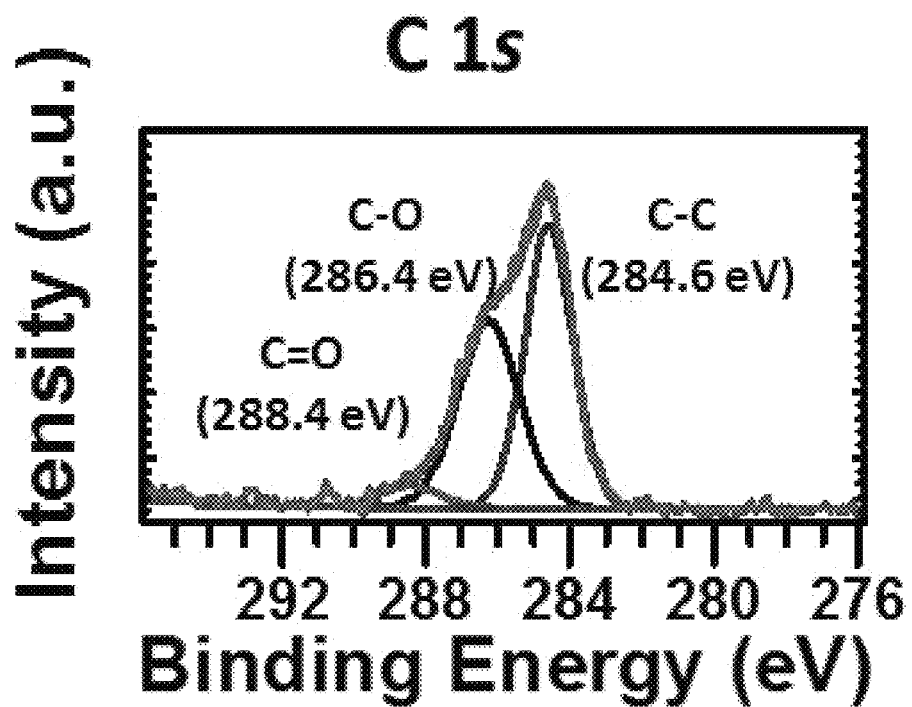

Another interesting observation is presence of high amount of oxygen within the wear track. This is attributed to the porous nature of the OLCs formed within the wear track which could easily adsorb oxygen. Oxygen adsorption is clear from the X-ray photoelectron spectroscopy (XPS) results shown in FIGS. 13A and 13B, showing high amount of oxygen on the surface in the survey scan and chemically bonded to carbon shown in the high resolution scan at C1s edge respectively. It is important to note that no sulfur was detected on the surface using XPS, which supports AES and LDSPI results indicating sulfur was mostly either at the sub-surface regions (below 5 nm from top) or sitting at the bottom of the wear track. The Raman data on the global scale, TEM/EELS data on the local scale, and additional key information regarding the elemental and chemical species using combination of AES, XPS, and LDSPI data bring out the key features of the chemical evolution of the tribo-layer taking place and strengthen the argument regarding the mechanism of OLC formation within the wear track.

Reactive Molecular Dynamic Studies:

To better understand the tribochemical mechanism that leads to such a dramatic friction reduction, large-scale RMD simulations were performed. The interactions between C, Mo, and S atoms was determined by using a reactive force field (ReaxFF) based on bond order formalism. ReaxFF provides a continuous treatment of formation/dissociation of bonds and dynamic charge transfer between atoms, and thereby, it describes chemical reaction pathways accurately. To understand the impact of S and Mo atoms on the structure of diamond nanoparticles, it was input that the surface of the nanodiamond is doped with Mo/S atoms at random locations (concentration ranging from 1 to 15%).

Nanodiamonds having a diameter of about 3 nm (7,200 C atoms) were used for all the simulations. All the atoms were imparted with velocities of Maxwell distribution, such that their kinetic energy was consistent with 2,000 K. Structural evolution of the nanodiamond containing S impurities was then monitored in canonical RMD simulations with a time step of 0.25 fs in large-scale atomic/molecular massively paralleled simulator (LAMMPS). The constant temperature conditions are maintained using Nose-Hoover thermostat. First, the impact of S-impurities on the diamond lattice is investigated at 2,000 K for 1 ns. Thereafter, the system is cooled from 2,000 to 300 K over 2 ns. To simulate the size effect on the load-bearing properties of the onion shell structures, onion structures were generated with 3, 4, 5, and 7 layers and their response to compressive uniaxial load (up to micro-newton range) was studied through MD simulations. The fracture load was identified by the sudden discontinuity or drop in the load vs. displacement curve.

It was reported that Van der Waals forces create high contact pressure on the order of gigaPascals on the molecules trapped between 2D layers. Meanwhile, other studies showed that during dry sliding, the local contact heating events may result in a temperature increase up to 1,773 K. Thus, under the experimental conditions employed in the experimental studies described herein, it is quite reasonable to assume that once $MoS_2$ wraps around nanodiamond clusters, the high contact pressure (1-2 GPa) and strong Van der Waals forces acting on these trapped nanodiamonds can lead to slow disintegration of $MoS_2$ into its constituent elements (i.e., Mo and S). Subsequently, Mo and S atoms can interact with the nanodiamond in the wear track.

Figure 14A:
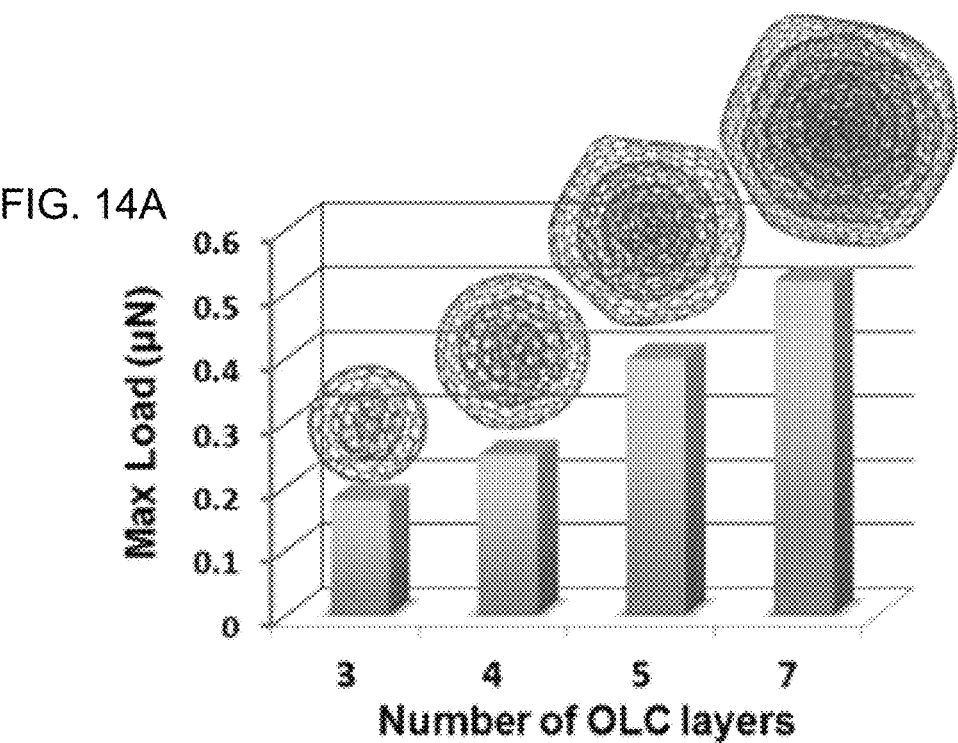
FIG. 14A is a bar chart and corresponding images of dependence of fracture loads on number of layers in the carbon onions, indicating increased load-bearing stability of OLC with increase in OLC layers.
Figure 14B:
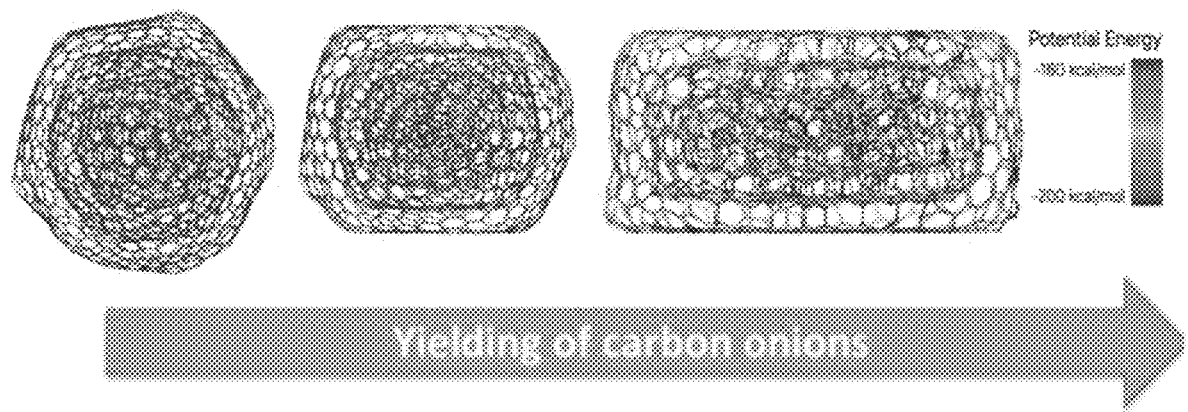
FIG. 14B are atomic snapshots during the compression of the OLC shown for the structure with 7 layers (the atoms are colored by their potential energy). The initially round shape of OLC is subjected to deformation and the limit of the load-bearing capability is determined based on bond breaking at the center of the structure.

Disintegration of $MoS_2$ was investigated at high contact pressure via RMD simulations by applying constant load on few layer $MoS_2$ sheets, as shown in FIGS. 14A-B. FIG. 14A is a bar chart and corresponding images of dependence of fracture loads on number of layers in the carbon onions, indicating increased load-bearing stability of OLC with increase in OLC layers. FIG. 14B are atomic snapshots during the compression of the OLC are shown for the structure with 7 layers (the atoms are colored by their potential energy). The initially round shape of OLC is subjected to deformation and the limit of the load-bearing capability is determined based on bond breaking at the center of the structure.

Figure 15:
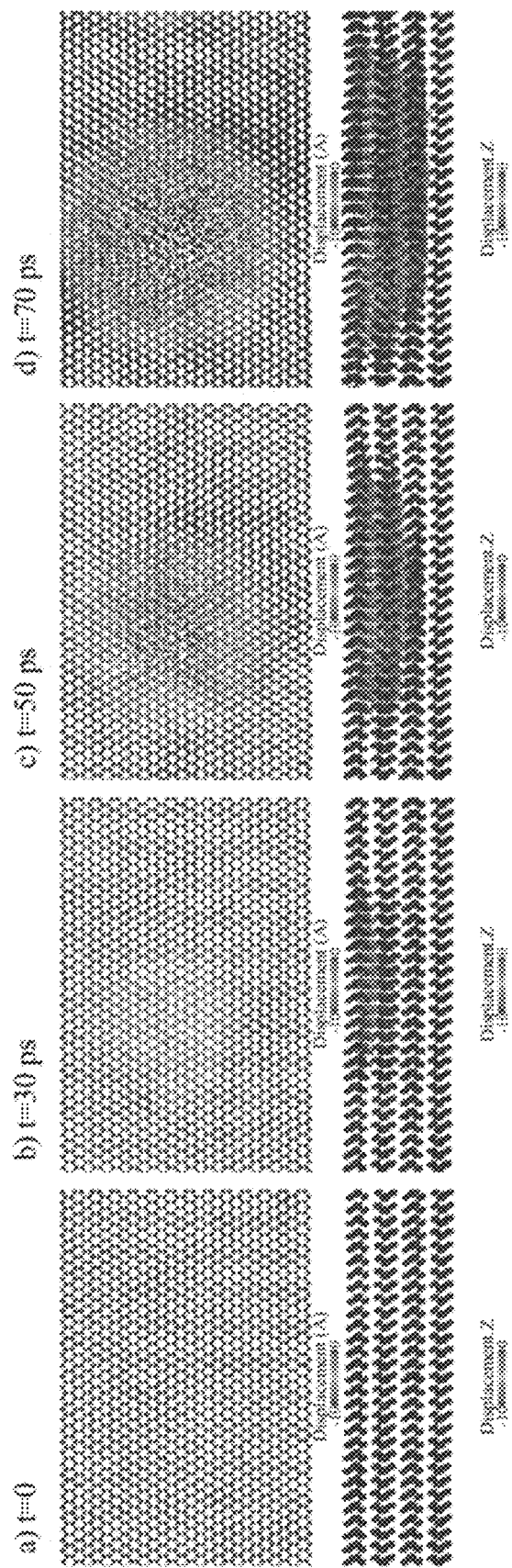
FIG. 15 are snapshots above depict the temporal evolution and reveal the disorder in the $MoS_2$ sheet after the pressure is applied through an indenter.

FIG. 15 are snapshots depicting the temporal evolution and reveal the disorder in the $MoS_2$ sheet after the pressure is applied through an indenter. The high contact pressures (about 1 GPa) on $MoS_2$ are indeed seen to cause significant structural disorder as seen from these simulation results suggesting it is very likely that $MoS_2$ can rupture in a physical sense. Interestingly, it was observed that rupture of few layers of $MoS_2$ layers is easier than single layer of $MoS_2$. Additionally, it is also likely that the detonated nanodiamonds have complex surface chemistry involving oxygenated species and dangling carbon bonds on the surface. Apart from high contact pressures caused by wrapping of $MoS_2$ around nanodiamond, the presence of oxygen and dangling bonds on the nanodiamond surface may provide reactive sites for the $MoS_2$ to chemically react with nanodiamond, and thereby, facilitate its disintegration. It is important to note that during the initial run-in period of a few 100 cycles (FIG. 3B), the friction is very high, which might raise the local temperature, and in turn, accelerate this tribochemical degradation process. Modeling such complex chemistries are beyond the reach of classical MD potentials currently available and would represent a very interesting future study.

Figure 16B:
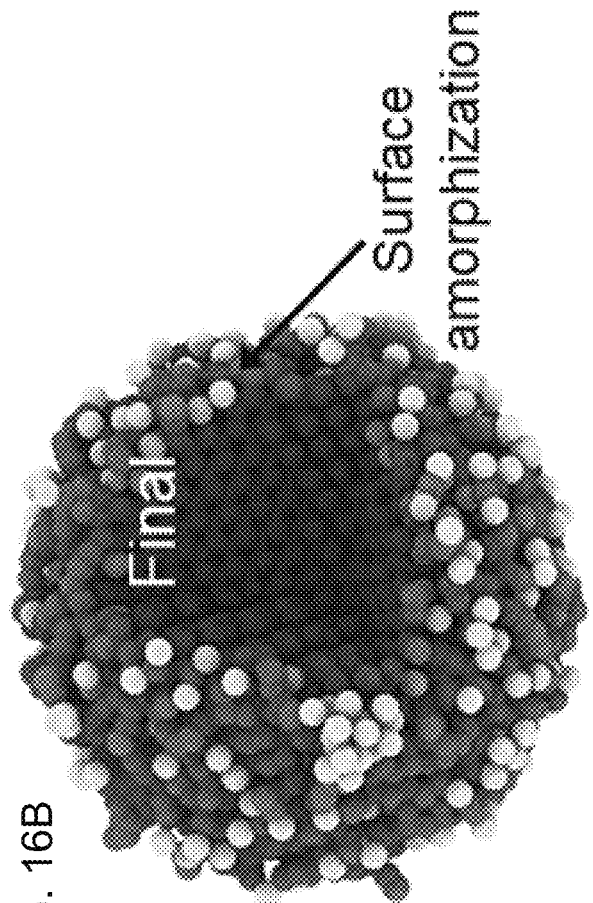
FIGS. 16A-B are illustrations of graphitization of nanodiamond in presence of molybdenum.
Figure 16A:
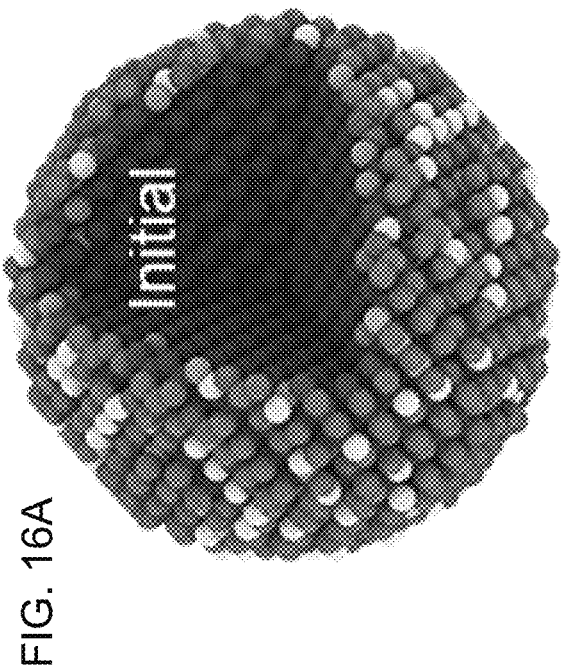

Atomistic simulations were performed to gain insights into the interaction of Mo and S atoms with nanodiamonds (FIG. 18A-H). FIGS. 18A-H are atomistic simulations of the tribochemical mechanism leading to reduction in friction. FIGS. 18A-18D are atomic snapshots from RMD simulations at selected times during the sulfur-induced amorphization of diamond nanoparticle. FIGS. 18E-18H are atomic snapshots from RMD simulations at selected times during the formation of OLC structures from amorphous carbon matrix containing uniformly dispersed S atoms (15% S concentration). The RMD simulations indicate that both S and Mo induce structural degradation of the nanodiamonds: S induces rapid amorphization of the diamond lattice as shown in the snapshots in FIGS. 18A-D, whereas Mo reacts locally with the neighboring C, shown in FIGS. 16A-B to form $Mo_2C$ (as also confirmed experimentally), which is thermodynamically feasible at the high temperatures (>1,500 K) observed under dry sliding conditions.

In the case of S, the large steric size of the S impurity causes strong S—S interaction, which is mediated by the distortion of the diamond lattice up to the next nearest-neighbor lattice sites. Simulations at varying S content of 1-15% suggest that amorphization occurs at the percolation threshold of the S—S network with the next nearest-neighbor connectivity (about 10% S concentration). For example, the snapshots in FIGS. 18A-D follow the structural change in the diamond lattice upon introducing S impurities at a concentration of 15% at 2,000 K, which is representative of the asperity-level flash temperatures typically achieved during dry sliding. The larger S atoms result in large localized strains (near the impurity site), which propagate through the diamond lattice and cause significant lattice distortion and disordering.

FIG. 19A are plots of pair distribution functions of C—C for each snapshot shown in FIGS. 18A and 18B, and FIG. 19 are plots of volumetric strains in the diamond lattice (Top) induced by substituting a C atom with different impurity atoms, and the corresponding defect energies $E_d$ (Bottom) obtained from DFT calculations. In FIGS. 18D-18H, the temperatures corresponding to the atomic snapshots are provided. In FIG. 19B (Top), $\Delta V$ refers to change in the volume of diamond lattice owing to introduction of a substitutional defect, and $V_0$ refers to the volume of diamond lattice at equilibrium.

The structural disorder manifests itself as a broadening of nearest-neighbor peaks, as well as progressive disappearance of higher order peaks in the C—C pair distribution functions (PDF) (FIG. 19A). The final structure is thus highly disordered, comparable to that of amorphous carbon (FIG. 18D). This S-induced disordering of the diamond lattice is observed regardless of the initial spatial distribution of the impurity S atoms. In a representative case, when all S atoms are initially placed only on the surface of nanodiamond, the S atoms diffuse into the sub-surface layers of nanodiamond, and induce large local strains. Subsequently, as aforementioned, the localized strains propagate through the lattice, causing disordering, i.e., amorphization of the nanodiamond as shown in FIGS. 17A-B.

Next, the structural evolution of this amorphized carbon matrix is tracked, the matrix containing 15% S impurities (obtained via S induced disordering of diamond nanoparticle, as shown in FIGS. 18A-D) upon cooling from 2,000 to 300 K over a period of 2 nanosecond (FIGS. 18E-H) using RMD simulations. During the first about 0.5 nanosecond of this cooling run, significant segregation of S atoms is observed, resulting in C-rich regions. Thereafter, graphitic carbon rings nucleate within the C rich regions over the next about 0.2 nanosecond. These nuclei, then, grow progressively into carbon nano-structures over the remainder of the run (i.e., about 1.3 nanosecond). Atomic re-arrangements occur within these nanostructures resulting in a highly ordered arrangement (FIG. 18H). The increase in C—C ordering in the formed carbon nanostructures is evidenced by the appearance of sharp peaks at characteristic separation distances in the C—C PDFs (FIG. 19A).

Interestingly, the C—C PDFs reveal a prominent shoulder appearing at about 2.85 Å during the crystallization stage, the intensity of which increases with time (FIG. 19A). This peak corresponds to intra-hexagon spacing in graphite, which suggests the formation of a more compact, homogeneous, and less defective structure with graphitic order. Analysis of the crystallized structure reveals an onion-like texture, which consists of numerous graphitic hollow spheres arranged concentrically in a layer-by-layer manner as confirmed experimentally by TEM observations. Note that the final OLC structures obtained from RMD simulations contain trace amounts of embedded S atoms (<1%). The strain induced by trace amounts of S is not sufficient to perturb the crystallinity (i.e., graphitic order) of OLC. The formation of these OLC structures has interesting ramifications for subsequent tribological processes. To elucidate the load-bearing properties of the shell structures, the response of these structures to compressive uniaxial stress was characterized through MD simulations (FIG. 14A-B). It should be highlighted that the initial high stiffness of the $MoS_2$ layers allows for encapsulation of large clusters of nanodiamonds into $MoS_2$ shells. Such shells play the role of a template for the formation of OLC structures of large size.

The experimental results indicate that the typical diameter of the scrolled structures is in the range of 20-30 nm (and up to 40 layers). The atomistic snapshots shown in FIGS. 14A-14B for a representative onion configuration with 5 layers, in which atoms are colored on a scale related to their potential energy, depict the structural evolution under an applied load. As shown in this simulation, the dimensional reduction along the compression direction is accompanied by significant volume expansion along the axial directions. The maximum sustainable load (MSL) for a given number of layers in a carbon onion (FIG. 19A) was quantified. With increasing number of layers, the MSL is also expected to increase (e.g., a linear extrapolation estimates MSL for 40-layer onion to be about 3.5 μN) which is experimentally shown to be capable of supporting significantly higher loads without failure. The simulations and experiments suggest that a stable superlubricity regime is possible with OLC diameters in the range of 20-30 nm.

Designing New Materials Using Density Functional Theory:

In addition to probing the tribo-chemical origin of the drastic reduction in friction, density functional theory calculations were employed to investigate the possibility of achieving amorphization of diamond (and subsequent crystallization into OLC) via other elements. All the density functional theory calculations were performed within the generalized gradient approximation in the projector augmented plane wave formalism implemented in VASP. The exchange correlation is described by the Perdew-Burke-Ernzerhof (PBE) functional using the pseudopotentials supplied by VASP.

To calculate the defect energy associated with substituting a C atom in diamond lattice with various impurities (B, S, Se, Te), a computational supercell consisting of 8 unit cells of diamond (64 atoms) was developed. An arbitrarily chosen C atom is then replaced with the given impurity atom to create the defective configuration. Periodic boundary conditions are employed along all directions. The plane-wave cut off is set at 520 eV. A Γ-centered 6×6×6 k grid is used to sample the Brillouin zone. The atomic positions, as well as the supercell volume and shape are optimized until the total energy converges to within 1 meV per atom. The substitution energy $E_d$ is defined by equation (1). For B, and S, the most stable crystalline polymorph is chosen as the reference state, while for O and N the gaseous molecules $O_2$ and $N_2$ are chosen as reference states respectively. Correction factors derived from recent high-throughput DFT calculations were employed to alleviate the well-known errors of GGA-PBE in describing energetics of molecular species $O_2$ and $N_2$.

The ease of substituting a carbon atom in the diamond lattice with different impurity atoms (namely, N, B, O, and S) was estimated by computing the corresponding defect energies ($E_d$) using the DFT calculations. Note that, any of these impurity atoms are unlikely to be incorporated in interstitial voids in diamond lattice, since they are highly unfavorable energetically. Table 1 summarizes the strain and defect energy of various dopants in a diamond lattice calculated using DFT.

TABLE 1

Strain and defect energy of various dopants in a diamond lattice calculated using DFT.

| Dopant | Substitution | | Interstitial | |
| --- | --- | --- | --- | --- |
| | Vol. Strain (%) | Defect (eV) | Vol. Strain (%) | Defect (eV) |
| S | 2.37 | 10.94 | 6.04 | 30.42 |
| B | 0.47 | 1.17 | 2.95 | 18.01 |
| O | 1.15 | 3.12 | 3.26 | 15.94 |
| N | 0.29 | 0.93 | 3.25 | 17.12 |

The DFT calculations show that atoms with small radii (i.e., B and N) can substitute C atoms in diamond lattice with low energy penalty ($E_d$<1.2 eV). O and S defects are associated with higher energies. Nevertheless, such defect energies can be surmounted under the extreme conditions afforded by tribology at nanoscale. Although substitutional defects of each of these impurities can occur at tribological interfaces, B, N, and O atoms induce low local strains (volumetric strain <0.5%), which is unlikely to cause significant distortion/disordering of the diamond lattice (FIG. 19B). The slightly larger S atom (1.15 Å) enables much higher local strains (about 2.37% volumetric strains) in the diamond lattice, and thereby, facilitates amorphization of nanodiamond.

The picture that emerges from the experimental and theoretical investigations is that, after initial encapsulation of nanodiamond clusters by 2D $MoS_2$ layers, the high contact pressure during sliding causes gradual disintegration of $MoS_2$ layers. Sulfur atoms from the surface diffuse into the sub-surface layers of nanodiamond sphere. The diffusion of sulfur into nanodiamond possibly takes place via interactions of sulfur with the oxygenated surface of the nanodiamond and induces large local strain causing significant lattice distortion. The mechanical stress-induced tribochemical reaction eventually induces graphitization of $sp^3$-bonded carbon all the way to the core of the cluster (FIGS. 18A-D) and initiates formation of concentric OLC structures (FIGS. 18E-H). Sulfur plays an important role in graphene formation starting from dehydrogenation of the outer shell of the diamond nanoparticles and followed by formation of bridging monosulfide linkages, which are further rearranged into the graphene lattice. Molybdenum also amorphizes nanodiamond. However, the graphitization rates are lower than those for sulfur (FIGS. 14A-B) and during the metal induced catalytic graphitization, the molybdenum forms stable molybdenum carbide compounds (FIG. 7G), which preclude onion formation. The in situ formation of OLCs reduces the effective contact area and provides an incommensurate surface against randomly oriented DLC, thus reducing the friction coefficient to the superlubric regime by a similar mechanism as for graphene scrolls with the exception that no tribochemical effect was observed in earlier studies protecting the nanodiamond from disintegration.

To summarize, a stress-induced tribochemical mechanism is shown proceeding in dry atmospheric conditions leading to macroscale superlubricity. The tribochemical reaction of sulfur with nanodiamond results in pressure- and stress-induced transformation of nanodiamond clusters into in situ formation of $sp^2$ bonded graphitic layers arranged into OLC structures, which are capable of providing the superlubricity when sliding against an amorphous H-DLC surface. Thus, the methods described herein may have an impact in developing oil-free solid lubricants for automotive and related applications.

Figure 20:
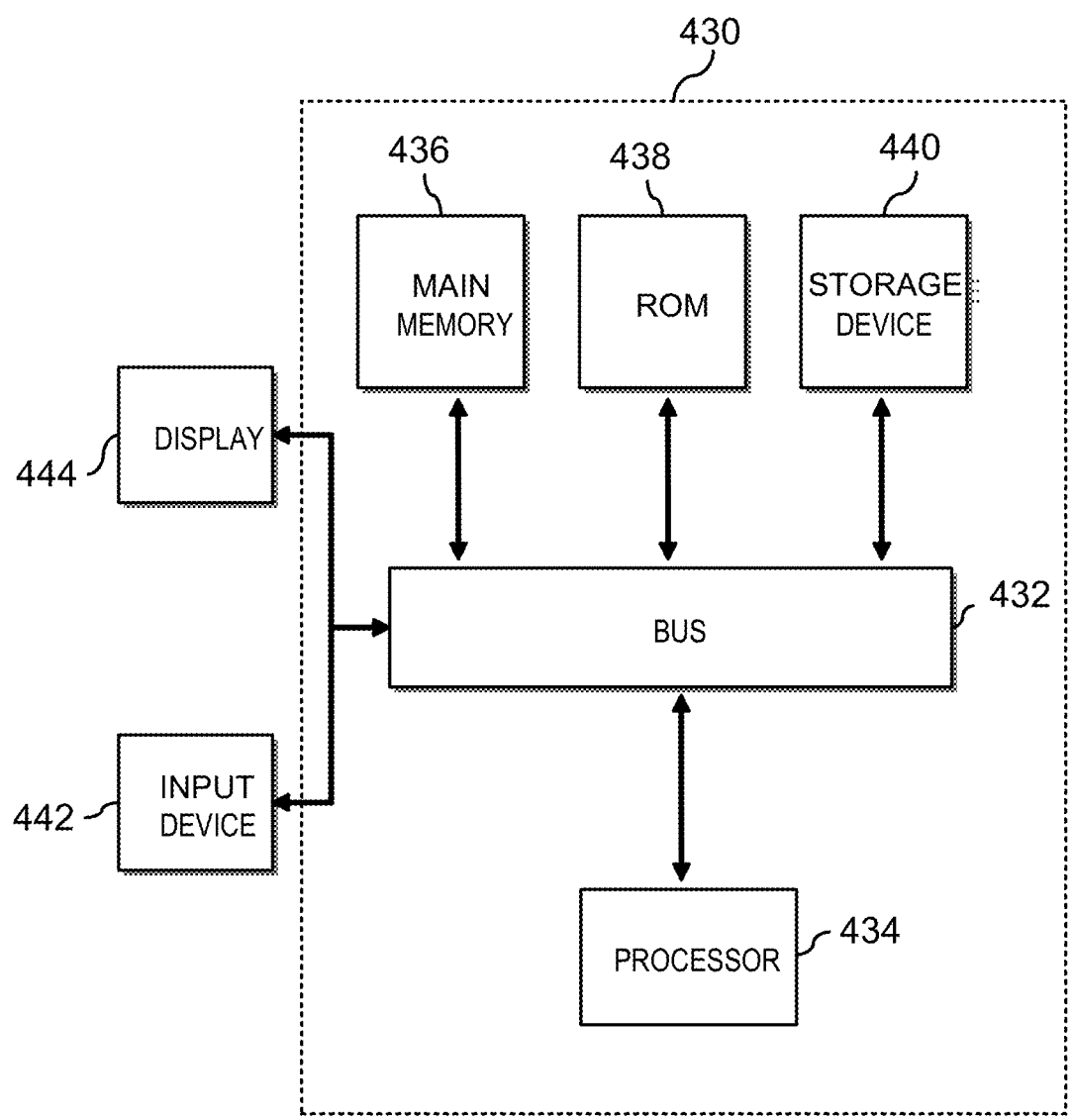
FIG. 20 is a schematic block diagram of a computing device which may be used as the computing system of FIG. 2.

Any of the methods defined herein, for example, the method 100 can be executed and a stored on a computer readable medium and executed by a computing device specifically programmed to execute the instructions stored on the computer readable medium. FIG. 20 is a block diagram of a computing device 430 in accordance with an illustrative implementation. The computing device 430 can be included in the system 200 and configured to execute the instructions stored in the super cell formation circuitry 204a, candidate material formation circuitry 204b and volumetric strain determining circuitry 204c, as described herein.

The computing device 430 includes a bus 432 or other communication component for communicating information and a processor 434 or processing circuit coupled to the bus 432 for processing information. The computing device 430 can also include one or more processors 434 or processing circuits coupled to the bus for processing information. The computing device 430 also includes a main memory 436, such as a random access memory (RAM) or other dynamic storage device, coupled to the bus 432 for storing information, and instructions to be executed by the processor 434. Main memory 436 can also be used for storing position information, temporary variables, or other intermediate information during execution of instructions by the processor 434. The computing device 430 may further include a read only memory (ROM) 438 or other static storage device coupled to the bus 432 for storing static information and instructions for the processor 434. A storage device 440, such as a solid-state device, magnetic disk or optical disk, is coupled to the bus 440 for persistently storing information and instructions.

The computing device 430 may be coupled via the bus 432 to a display 435, such as a liquid crystal display, or active matrix display, for displaying information to a user. An input device 442, such as a keyboard including alphanumeric and other keys, may be coupled to the bus 432 for communicating information and command selections to the processor 434. In another implementation, the input device 442 has a touch screen display 444. The input device 442 can include a cursor control, such as a mouse, a trackball, or cursor direction keys, for communicating direction information and command selections to the processor 434 and for controlling cursor movement on the display 444.

According to various implementations, the processes and methods described herein can be implemented by the computing device 430 in response to the processor 434 executing an arrangement of instructions contained in main memory 436. Such instructions can be read into main memory 436 from another non-transitory computer-readable medium, such as the storage device 440. Execution of the arrangement of instructions contained in main memory 436 causes the computing device 430 to perform the illustrative processes described herein. One or more processors in a multi-processing arrangement may also be employed to execute the instructions contained in main memory 436. In alternative implementations, hard-wired circuitry may be used in place of or in combination with software instructions to effect illustrative implementations. Thus, implementations are not limited to any specific combination of hardware circuitry and software.

Although an example computing device has been described in FIG. 20, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1,000 would include 900 to 1,100.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for designing new materials for superlubricity, comprising;
   developing, on a computational system, a computational supercell comprising a number of unit cells of a base material, each unit cell comprising a number of atoms of the base material;
   replacing, by the computational system, a randomly chosen number of atoms of the base material with an impurity atom of an impurity material to form a candidate material, the impurity material comprising a noncarbonaceous material;
   determining, by the computational system, volumetric strain of the candidate material;
   in response to the volumetric strain exceeding a predetermined threshold, the predetermined threshold corresponding to a volumetric strain of equal to or greater than 2%, determining, by the computational system, that the candidate material has superlubricity; and
   displaying, by the computational system, the candidate material to a user if the candidate material has superlubricity.

2. The method of claim 1, further comprising:
   determining, by the computational system, a substitution energy for replacing an atoms of the base material with an impurity atom, the substitution energy corresponding to the volumetric strain.

3. The method of claim 1, wherein the volumetric strain exceeding the predetermined threshold corresponds to the base material being amorphized.

4. The method of claim 1, wherein the volumetric strain is determined, by the computational system, via density functional theory calculations performed within a generalized gradient approximation in a projector augmented plane wave formalism implemented in Vienna Ab initio Simulation Package (VASP).

5. The method of claim 4, further comprising determining, by the computational system, an exchange correlation for replacing the randomly chosen z atoms of the base material, the exchange correlation described by a Perdew-Burke-Ernzerhof (PBE) functional using pseudopotentials supplied by VASP.

6. The method of claim 1, further comprising using periodic boundary conditions, by the computational system, in all directions of the candidate material.

7. The method of claim 1, further comprising:
   setting, by the computational system, a plane-wave cut off in a range of 500-550 eV; and
   using, by the computational system, a Γ-centered 6×6×6 k grid to sample a Brillouin zone of the candidate material.

8. The method of claim 1, further comprising optimizing, by the computational system, atomic positions, a volume and a shape of the computational supercell until a total energy of the computation supercell converges to within 1 meV per atom.

9. The method of claim 1, wherein the base material consists essentially of a carbon material, and the impurity material comprises one of a phosphorene or a transition metal dichalcogenide.

10. A computational system for designing new materials having superlubricity, comprising:
    a user interface configured to receive an input from a user;
    a display;
    a memory, and
    a processing circuit comprising a processor, the processing circuit configured to:
      receive instructions for developing a computational supercell comprising a number of unit cells of a base material via the user interface, each unit cell comprising a number of atoms of the base material;
develop the supercell;
receive information corresponding to an impurity material via the user interface;
replace a randomly chosen number of atoms of the base material with an impurity atom of an impurity material to form a candidate material, the impurity material comprising a noncarbonaceous material;
determine a volumetric strain of the candidate material;
in response to the volumetric strain exceeding a predetermined threshold, the predetermined threshold corresponding to a volumetric strain of equal to or greater than 2%, determine that the candidate material has superlubricity; and
display the candidate material on the display.

11. The computational system of claim 10, further comprising:
determine a substitution energy for replacing an atom of the base material with an impurity atom, the substitution energy corresponding to the volumetric strain.

12. The computational system of claim 10, wherein the volumetric strain exceeding the predetermined threshold corresponds to the base material being amorphized.

13. The computational system of claim 10, wherein the processing circuit is configured to determine the volumetric strain via density functional theory calculations performed within a generalized gradient approximation in a projector augmented plane wave formalism implemented in Vienna Ab initio Simulation Package (VASP).

14. The computational system of claim 13, wherein the processing circuit is further configured to determine an exchange correlation for replacing the randomly chosen z atoms of the base material, the exchange correlation described by a Perdew-Burke-Ernzerhof (PBE) functional using pseudopotentials supplied by VASP.

15. The computational system of claim 10, wherein the processing circuit is further configured to use periodic boundary conditions in all directions of the candidate material.

16. The computational system of claim 10, wherein the processing circuit is further configured to:
set a plane-wave cut off in a range of 500-550 eV; and
use a $\Gamma$-centered 6×6×6 k grid to sample a Brillouin zone of the candidate material.

17. The computational system of claim 10, wherein the processing circuit is further configured to optimize atomic positions, a volume and a shape of the computational supercell until a total energy of the computation supercell converges to within 1 meV per atom.

18. The computational system of claim 10, wherein the base material consists essentially of a carbon material, and the impurity material comprises one of a phosphorene or a transition metal dichalcogenide.

* * * * *